United States Patent
Uenishi et al.

(10) Patent No.: US 9,632,475 B2
(45) Date of Patent: Apr. 25, 2017

(54) LUBRICANT APPLICATOR, IMAGE FORMING APPARATUS, AND PROCESS CARTRIDGE

(71) Applicants: Hiroyuki Uenishi, Kanagawa (JP); Takeshi Shintani, Kanagawa (JP); Kenji Honjoh, Kanagawa (JP); Shinya Karasawa, Kanagawa (JP); Daisuke Tomita, Kanagawa (JP); Kohsuke Yamamoto, Kanagawa (JP); Norio Kudo, Kanagawa (JP)

(72) Inventors: Hiroyuki Uenishi, Kanagawa (JP); Takeshi Shintani, Kanagawa (JP); Kenji Honjoh, Kanagawa (JP); Shinya Karasawa, Kanagawa (JP); Daisuke Tomita, Kanagawa (JP); Kohsuke Yamamoto, Kanagawa (JP); Norio Kudo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/830,417

(22) Filed: Aug. 19, 2015

(65) Prior Publication Data
US 2015/0355594 A1 Dec. 10, 2015

Related U.S. Application Data

(63) Continuation of application No. 13/939,683, filed on Jul. 11, 2013, now Pat. No. 9,122,225.

(30) Foreign Application Priority Data

Jul. 31, 2012 (JP) .................................. 2012-169873
Jul. 31, 2012 (JP) .................................. 2012-169906

(51) Int. Cl.
*G03G 21/00* (2006.01)
*G03G 15/00* (2006.01)
(Continued)

(52) U.S. Cl.
CPC ......... *G03G 21/0094* (2013.01); *F16N 11/00* (2013.01); *F16N 29/00* (2013.01); *F16N 29/02* (2013.01)

(58) Field of Classification Search
CPC ...... F16N 29/00; F16N 29/02; F16N 2200/06; F16N 2250/18; F16N 200/56;
(Continued)

(56) References Cited

U.S. PATENT DOCUMENTS

| | | |
|---|---|---|
| 2005/0164108 A1 | 7/2005 | Murakami et al. |
| 2007/0059067 A1 | 3/2007 | Tanaka et al. |

(Continued)

FOREIGN PATENT DOCUMENTS

| | | |
|---|---|---|
| CN | 102221806 A | 10/2011 |
| CN | 102467056 A | 5/2012 |

(Continued)

OTHER PUBLICATIONS

Office Action issued on Feb. 5, 2016 in Japanese Patent Application No. 2012-169873.
(Continued)

*Primary Examiner* — Billy Lactaoen
*Assistant Examiner* — Arlene Heredia Ocasio
(74) *Attorney, Agent, or Firm* — Oblon, McClelland, Maier & Neustadt, L.L.P.

(57) ABSTRACT

A lubricant applicator includes a lubricant, a supply member contactable against the lubricant to supply the lubricant to a target, and a lubricant gauge to detect whether an amount of lubricant remaining is less than a threshold value. The lubricant gauge includes a rotary member rotatable about a shaft, a pressing member to press and rotate the rotary member as the lubricant is consumed, a contact part of the rotary member pressed by the pressing member, and a
(Continued)

detection part of the rotary member opposite to the contact part across the shaft of the rotary member.

20 Claims, 15 Drawing Sheets

(51) Int. Cl.
*F16N 29/00* (2006.01)
*F16N 29/02* (2006.01)
*F16N 11/00* (2006.01)

(58) Field of Classification Search
CPC ............. F16N 200/559; F16N 200/239; F16N 200/245; F16N 200/244; F16N 200/25; F16N 184/99
USPC ........ 399/346; 200/560, 559, 239, 245, 244, 200/250
See application file for complete search history.

(56) References Cited

U.S. PATENT DOCUMENTS

| | | | |
|---|---|---|---|
| 2007/0172273 A1 | 7/2007 | Harada et al. | |
| 2007/0258743 A1 | 11/2007 | Shakuto et al. | |
| 2008/0181689 A1 | 7/2008 | Fujimori | |
| 2009/0060600 A1 | 3/2009 | Ninomiya et al. | |
| 2009/0103944 A1 | 4/2009 | Shintani et al. | |
| 2010/0014087 A1* | 1/2010 | Takahashi | F16C 33/667 356/442 |
| 2010/0021205 A1 | 1/2010 | Honjoh et al. | |
| 2010/0074637 A1 | 3/2010 | Shiraishi | |
| 2010/0183349 A1 | 7/2010 | Shintani et al. | |
| 2010/0209164 A1* | 8/2010 | Tanaka | B65H 29/14 399/407 |
| 2011/0076075 A1 | 3/2011 | Arai et al. | |
| 2011/0123239 A1 | 5/2011 | Azeyanagi et al. | |
| 2011/0170908 A1 | 7/2011 | Saitoh et al. | |
| 2011/0217101 A1 | 9/2011 | Okamoto et al. | |
| 2011/0229232 A1* | 9/2011 | Kojima | G03G 21/007 399/346 |
| 2011/0274474 A1 | 11/2011 | Arai et al. | |
| 2012/0134700 A1 | 5/2012 | Yamaki et al. | |
| 2012/0195661 A1 | 8/2012 | Karasawa et al. | |
| 2012/0315053 A1 | 12/2012 | Kudo et al. | |
| 2012/0321330 A1 | 12/2012 | Kudo et al. | |
| 2013/0251380 A1* | 9/2013 | Fujimori | G03G 21/0094 399/24 |
| 2013/0251382 A1 | 9/2013 | Honjoh et al. | |
| 2014/0037302 A1 | 2/2014 | Gotoh et al. | |
| 2014/0037303 A1 | 2/2014 | Tomita et al. | |

FOREIGN PATENT DOCUMENTS

| | | | |
|---|---|---|---|
| CN | 103324068 A | | 9/2013 |
| JP | 04137420 A | * | 5/1992 |
| JP | 8-146842 | | 6/1996 |
| JP | 8-314346 | | 11/1996 |
| JP | 2010-76883 A | | 4/2010 |
| JP | 2010-271665 | | 12/2010 |
| JP | 2012-103531 A | | 5/2012 |

OTHER PUBLICATIONS

U.S. Appl. No. 13/790,017, filed Mar. 8, 2013.
U.S. Appl. No. 13/847,556, filed Mar. 20, 2013.
U.S. Appl. No. 13/848,307, filed Mar. 21, 2013.
U.S. Appl. No. 13/827,444, filed Mar. 14, 2013.

* cited by examiner

CUMULATIVE DISTANCE
TRAVELED BY APPLICATION ROLLER [Km]

LUBRICANT APPLICATOR, IMAGE FORMING APPARATUS, AND PROCESS CARTRIDGE

CROSS-REFERENCE TO RELATED APPLICATION

This patent application is a continuation of U.S. patent application Ser. No. 13/939,683 filed Jul. 11, 2013, which is based on and claims priority pursuant to 35 U.S.C. §119 to Japanese Patent Applications No. 2012-169873 filed Jul. 31, 2012, and No. 2012-169906 filed Jul. 31, 2012, both in the Japan Patent Office, the entire disclosures of each of which are hereby incorporated by reference herein.

BACKGROUND

Technical Field

Exemplary aspects of the present invention generally relate to a lubricant applicator, an image forming apparatus including the lubricant applicator, and a process cartridge included in the image forming apparatus.

Related Art

Related-art image forming apparatuses, such as copiers, printers, facsimile machines, and multifunction devices having two or more of copying, printing, and facsimile capabilities, typically form a toner image on a recording medium (e.g., a sheet of paper, etc.) according to image data using, for example, an electrophotographic method. In the electrophotographic method, for example, a charger charges a surface of an image carrier (e.g., a photoconductor); an irradiating device emits a light beam onto the charged surface of the photoconductor to form an electrostatic latent image on the photoconductor according to the image data; a developing device develops the electrostatic latent image with a developer (e.g., toner) to form a toner image on the photoconductor; a transfer device transfers the toner image formed on the photoconductor onto a sheet of recording media; and a fixing device applies heat and pressure to the sheet bearing the toner image to fix the toner image onto the sheet. The sheet bearing the fixed toner image is then discharged from the image forming apparatus.

The image forming apparatuses often further include a lubricant applicator that supplies a lubricant to a surface of an image carrier, such as the photoconductor and an intermediate transfer belt included in the transfer device, for protection and reduced friction.

However, when image formation is performed with the lubricant used up and not supplied to the image carrier, the image carrier, which is not protected by the lubricant, abrades and deteriorates. To solve this problem, the lubricant applicator often includes a lubricant detector that detects a stage in which the lubricant is almost used up (hereinafter referred to as a near-end stage of the lubricant).

FIG. 1 is a schematic perspective view illustrating an example of a configuration of a lubricant detector included in a related-art lubricant applicator.

The lubricant applicator illustrated in FIG. 1 includes a lubricant holder 143 formed of an electrically conductive material, a solid lubricant 140 held by the lubricant holder 143, and first and second electrode members 181 and 182 that contact both ends of the lubricant holder 143, respectively, when the solid lubricant 140 has a small amount remaining. A detection circuit 183 is connected to both the first and second electrode members 181 and 182, and applies a voltage between the first and second electrode members 181 and 182 to detect whether or not an electric current flows therebetween. The lubricant holder 143 is biased toward a supply member, not shown, by springs 142.

In the early stage of use of the solid lubricant 140, the lubricant holder 143 is positioned away and thus electrically isolated from both the first and second electrode members 181 and 182, so that no electric current flows between the first and second electrode members 181 and 182. As the solid lubricant 140 is gradually scraped off by the supply member over time, the lubricant holder 143 is moved toward the supply member by a biasing force of the springs 142. When the solid lubricant 140 reaches the near-end stage, the conductive lubricant holder 143 contacts the first and second electrode members 181 and 182. As a result, an electric current flows between the first and second electrode members 181 and 182, so that the detection circuit 183 detects the near-end stage of the solid lubricant 140.

As described above, the lubricant holder 143 is moved toward the supply member as the solid lubricant 140 is consumed and approaches the near-end stage. Thereafter, when the solid lubricant 140 reaches the near-end stage, the lubricant holder 143 is positioned near a contact portion in which the solid lubricant 140 is contacted by the supply member. Such a configuration requires the first and second electrode members 181 and 182 to be disposed to contact the lubricant holder 143, which is positioned near the contact portion, when the solid lubricant 140 reaches the near-end stage. In other words, the first and second electrode members 181 and 182 are disposed near the contact portion in which the supply member, not shown, contacts the solid lubricant 140. Consequently, powdered lubricant, which is scraped off from the solid lubricant 140 by the supply member, may adhere to the first and second electrode members 181 and 182. Adherence of the powdered lubricant to the first and second electrode members 181 and 182 hinders establishment of electrical continuity between the first and second electrode members 181 and 182 even when the lubricant holder 143 contacts the first and second electrode members 181 and 182 upon reaching the near-end stage, thereby possibly preventing accurate detection of the near-end stage of the solid lubricant 140.

SUMMARY

In view of the foregoing, illustrative embodiments of the present invention provide a novel lubricant applicator that reliably detects that an amount of remaining of a solid lubricant is smaller than a threshold value. Illustrative embodiments of the present invention also provide an image forming apparatus including the lubricant applicator, and a process cartridge included in the image forming apparatus.

In one illustrative embodiment, a lubricant applicator includes a lubricant, a supply member contactable against the lubricant to supply the lubricant to a target, and a lubricant gauge to detect whether an amount of lubricant remaining is less than a threshold value. The lubricant gauge includes a rotary member rotatable about a shaft, a pressing member to press and rotate the rotary member as the lubricant is consumed, a contact part of the rotary member pressed by the pressing member, and a detection part of the rotary member opposite to the contact part across the shaft of the rotary member.

In another illustrative embodiment, an image forming apparatus includes an image carrier, from which an image formed thereon is transferred onto a recording medium to form the image on the recording medium, and the lubricant applicator described above. The lubricant applicator is disposed opposite the image carrier to supply the lubricant to a surface of the image carrier.

In yet another illustrative embodiment, a process cartridge detachably installable in an image forming apparatus includes an image carrier and the lubricant applicator described above.

Additional features and advantages of the present disclosure will become more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1:
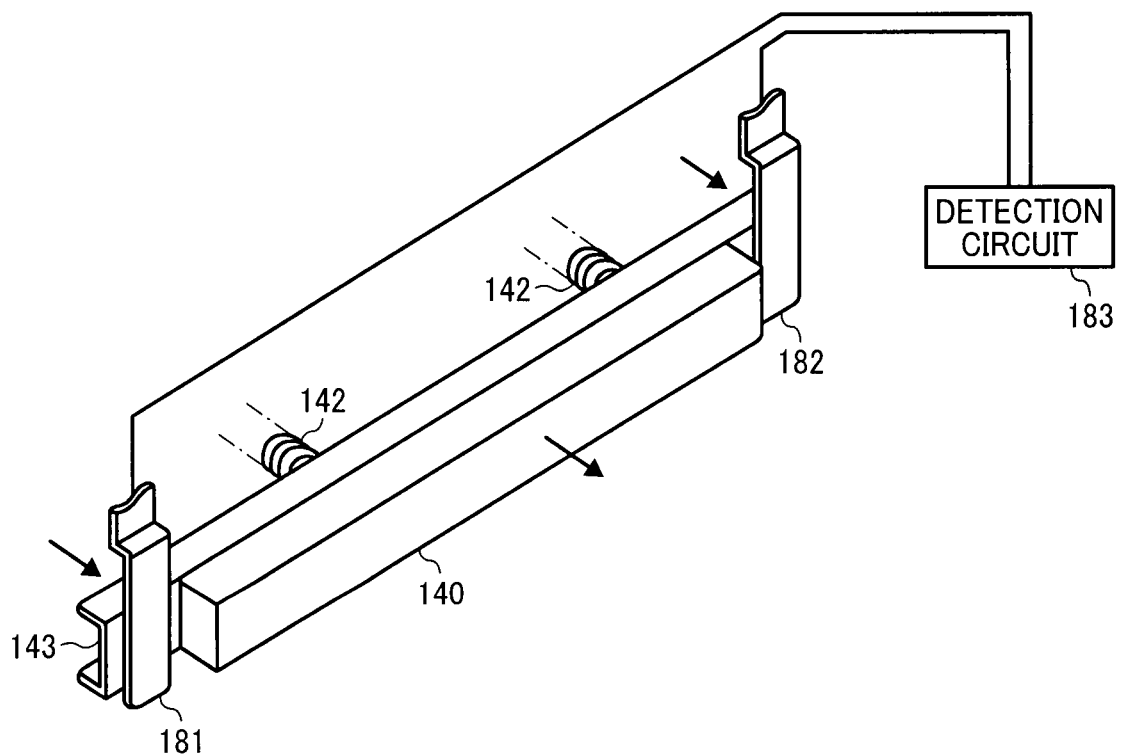
FIG. 1 is a schematic perspective view illustrating an example of a configuration of a lubricant detector included in a related-art lubricant applicator.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have substantially the same function, operate in a similar manner, and achieve a similar result.

Illustrative embodiments of the present invention are now described below with reference to the accompanying drawings. In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

A configuration and operation of an image forming apparatus 10 according to illustrative embodiments are described in detail below.

Figure 2:
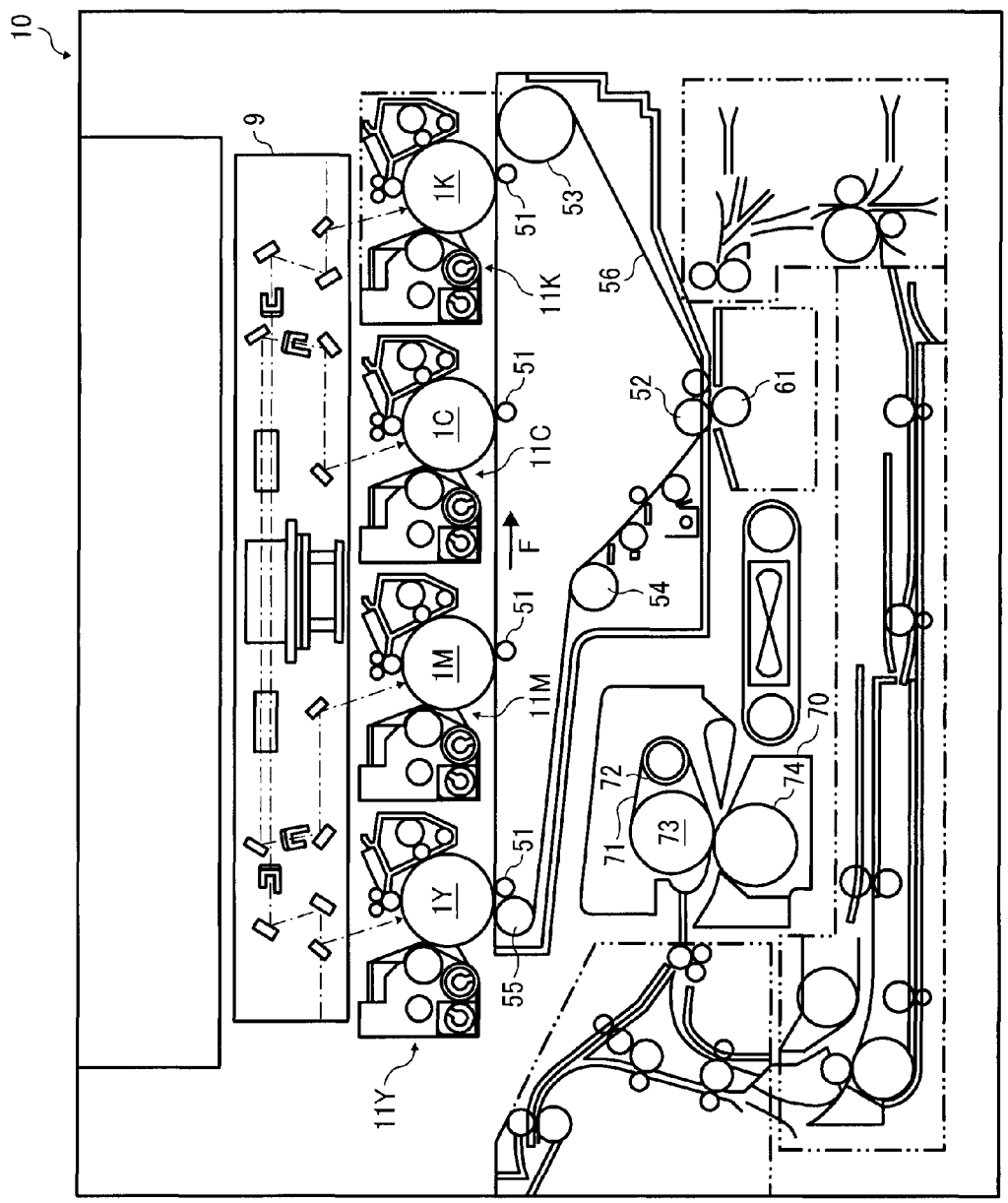
FIG. 2 is a vertical cross-sectional view illustrating an example of a configuration of an image forming apparatus according to illustrative embodiments.

FIG. 2 is a vertical cross-sectional view illustrating an example of a configuration of the image forming apparatus 10.

The image forming apparatus 10 is a printer employing an electrophotographic method and includes an intermediate transfer belt 56 serving as an image carrier. The intermediate transfer belt 56 is an endless belt formed of a heat resistant material such as polyimide and polyamide, and includes a base with medium resistance. The intermediate transfer belt 56 is disposed substantially at the center of the image forming apparatus 10 and is wound around rollers 52, 53, 54, and 55 to be rotatively driven in a clockwise direction indicated by arrow F in FIG. 2. Four imaging units 11Y, 11M, 11C, and 11K (hereinafter collectively referred to as imaging units 11), each forming a toner image of a specific color, that is, yellow (Y), magenta (M), cyan (C), or black (K), are disposed side by side along a direction of rotation of the intermediate transfer belt 56 above the intermediate transfer belt 56.

Figure 3:
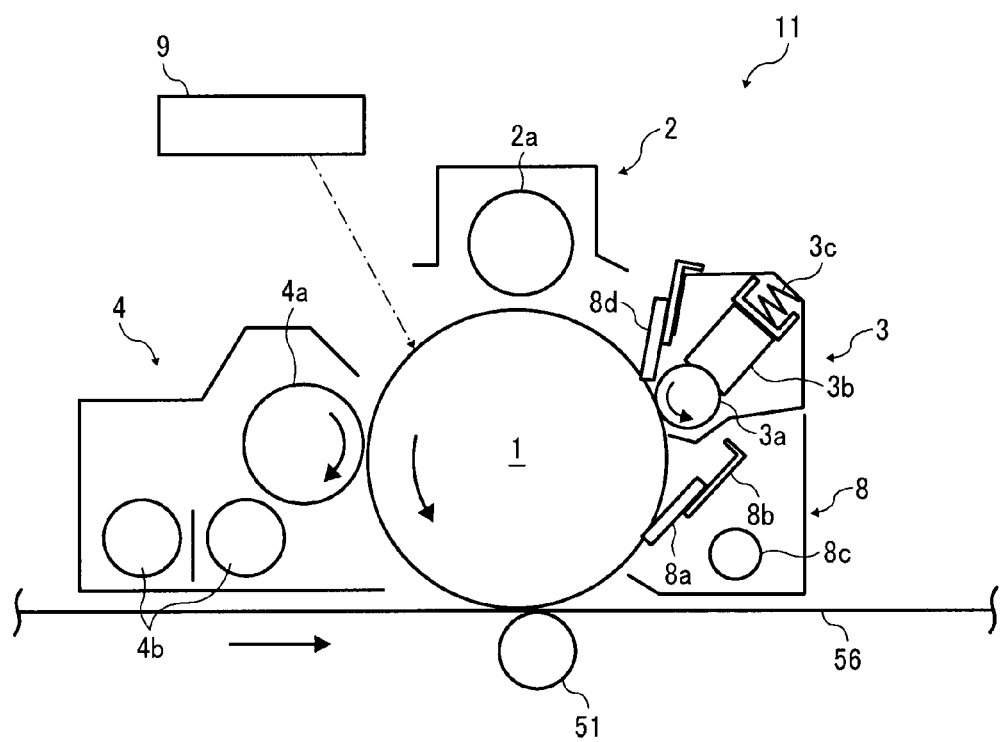
FIG. 3 is an enlarged vertical cross-sectional view illustrating an example of a configuration of a process cartridge included in the image forming apparatus.

FIG. 3 is an enlarged vertical cross-sectional view illustrating an example of a configuration of one of the imaging units 11 included in the image forming apparatus 10.

It is to be noted that the imaging units 11 have the same basic configuration, differing only in a color of toner used. Therefore, suffixes Y, M, C, and K, each indicating a color of toner used, are hereinafter omitted. The imaging unit 11 includes an image carrier, which in the present illustrative embodiment, is a photoconductor 1. A charger 2 that evenly charges a surface of the photoconductor 1 such that the photoconductor 1 has a predetermined negative polarity, a developing device 4 that develops an electrostatic latent image formed on the surface of the photoconductor 1 with negatively charged toner to form a toner image on the surface of the photoconductor 1, a lubricant applicator 3 that supplies lubricant to the surface of the photoconductor 1, and a cleaning device 8 that cleans the surface of the photoconductor 1 after transfer of the toner image from the photoconductor 1 onto the intermediate transfer belt 56 are disposed around the photoconductor 1.

The photoconductor 1, the charger 2, the developing device 4, the cleaning device 8, and the lubricant applicator 3, each included in the imaging unit 11, are formed together as a single integrated process cartridge detachably installable in the image forming apparatus 10, and thus integrally replaceable with a new imaging unit 11. It is to be noted that, the imaging unit 11 is hereinafter also referred to as a process cartridge 11.

Returning to FIG. 2, an electrostatic latent image forming device, which, in the present illustrative embodiment, is an irradiating device 9, is disposed above the imaging units 11. The irradiating device 9 irradiates the charged surface of each photoconductor 1 with light based on image data of the corresponding color to form an electrostatic latent image on the surface of each photoconductor 1. Inside the loop of the intermediate transfer belt 56, primary transfer devices, which, in the present illustrative embodiment, are primary transfer rollers 51, are disposed opposite photoconductors 1Y, 1M, 1C, and 1K (hereinafter collectively referred to as photoconductors 1), respectively, with the intermediate transfer belt 56 interposed therebetween. The primary transfer rollers 51 primarily transfer the toner images formed on the photoconductors 1 onto the intermediate transfer belt 56, so that the toner images are sequentially superimposed one atop the other on the intermediate transfer belt 56 to form a single full-color toner image on the intermediate transfer belt 56. The primary transfer rollers 51 are connected to a power source, not shown, by which a predetermined voltage is applied.

Outside the loop of the intermediate transfer belt 56, a secondary transfer device, which, in the present illustrative embodiment, is a secondary transfer roller 61, is disposed opposite the roller 52 with the intermediate transfer belt 56 interposed therebetween. The secondary transfer roller 61 is pressed against the roller 52 via the intermediate transfer belt 56 and is connected to a power source, not shown, by which a predetermined voltage is applied. The secondary transfer roller 61 and the intermediate transfer belt 56 contact each other at a secondary transfer position where the full-color toner image formed on the intermediate transfer belt 56 is secondarily transferred onto a recording medium such as a transfer sheet. A fixing device 70 that fixes the toner image onto the transfer sheet is disposed downstream from the secondary transfer position in a direction of conveyance of the transfer sheet. The fixing device 70 includes a heat roller 72, within which a halogen heater is disposed, a fixing roller 73, an endless fixing belt 71 wound around the heat roller 72 and the fixing roller 73, and a pressing roller 74 disposed opposite the fixing roller 73 with the fixing belt 71 interposed therebetween. The pressing roller 74 is pressed against the fixing roller 73 via the fixing belt 71. A sheet feeder, not shown, that accommodates and feeds the transfer sheet to the secondary transfer position is disposed in a lower part of the image forming apparatus 10.

The photoconductor 1 is an organic photoconductor having a protective layer formed of polycarbonate resin. The charger 2 includes a charging member, which, in the present illustrative embodiment, is a charging roller 2a. The charging roller 2a includes a conductive metal core coated with an elastic layer with medium resistance, and is connected to a power source, not shown, by which a predetermined voltage is applied. The charging roller 2a and the photoconductor 1 are disposed opposite each other across a minute gap. For example, a spacer member having a certain thickness may be wound around both ends of the charging roller 2a within a non-image forming range, so that each spacer member contacts the photoconductor 1 to form the minute gap between the charging roller 2a and the photoconductor 1.

The developing device 4 includes a developer bearing member, which, in the present illustrative embodiment, is a developing sleeve 4a. The developing sleeve 4a has a magnetic field generator therewithin and is disposed opposite the photoconductor 1. Two screws 4b, each mixing toner supplied from a toner bottle, not shown, with developer and supplying the developer including the toner and magnetic carrier to the developing sleeve 4a, are disposed below the developing sleeve 4a. A thickness of the developer thus supplied to the developing sleeve 4a is restricted by a doctor blade, not shown, so that the developing sleeve 4a bears the developer having a predetermined thickness. The developing sleeve 4a bears the developer while rotating in a clockwise direction in FIG. 3 to supply the toner to the electrostatic latent image formed on the photoconductor 1. Although the developing device 4 employs a two-component developing system in the above-described example, the configuration is not limited thereto. Alternatively, the developing device 4 may employ a single-component developing system.

The lubricant applicator 3 includes a solid lubricant 3b accommodated within a stationary casing, and a supply member, which, in the present illustrative embodiment, is an application roller 3a that supplies powdered lubricant scraped off from the solid lubricant 3b onto the surface of the photoconductor 1. The application roller 3a may be constructed of a brush roller, a urethane foam roller, or the like. In a case in which the application roller 3a is constructed of a brush roller, it is preferable that the brush roller be formed of a material having a volume resistance of from $1 \times 10^3$ $\Omega/cm$ to $1 \times 10^8$ $\Omega/cm$, in which a resistance control material such as carbon black is added to resin such as nylon and acrylic. The application roller 3a is rotated counterclockwise in FIG. 3. In other words, the application roller 3a is rotated in the opposite direction to the direction of rotation of the photoconductor 1 at a contact portion in which the photoconductor 1 and the application roller 3a contact each other.

The solid lubricant 3b has a square shape and is pressed against the application roller 3a by a pressing mechanism 3c. The solid lubricant 3b includes at least a fatty acid metal salt. Examples of the fatty acid metal salt include, but are not limited to, fluorocarbon resins, lamellar crystallization such as zinc stearate, calcium stearate, barium stearate, aluminum stearate, and magnesium stearate, lauroyl lysine, monocetyl sodium phosphate, and lauroyltaurine calcium. Of these, zinc stearate is most preferable. Zinc stearate spreads well on the surface of the photoconductor 1 and has lower hygroscopicity. In addition, zinc stearate keeps high lubricating property even under changes in humidity. Thus, a protective layer is formed of the lubricant, which has high protecting property and is less affected by environmental changes, on the surface of the photoconductor 1, thereby protecting the surface of the photoconductor 1. In addition, as described previously, the solid lubricant 3b keeps high lubricating property against humidity changes, so that cleaning of the surface of the photoconductor 1 is preferably performed. It is to be noted that, alternatively, liquid materials such as silicone oil, fluorocarbon oil, and natural wax, or gaseous materials may be added to the fatty acid metal salt to produce the solid lubricant 3b.

It is also preferable that the solid lubricant 3b include an inorganic lubricant such as boron nitride. Examples of crystalline structures of boron nitride include, but are not limited to, low-pressure phase hexagonal boron nitride (h-BN) and high-pressure phase cubic boron nitride (c-BN). Of these, low-pressure phase hexagonal boron nitride has a layered structure and is easily cleaved, so that low coefficient of friction at less than 0.2 is kept up to around 400° C. In addition, characteristics of low-pressure phase hexagonal boron nitride are less affected by electrical discharge. Therefore, compared to other materials, low-pressure phase hexagonal boron nitride more reliably keeps lubricating property even when an electric discharge is applied. Addition of boron nitride to the solid lubricant 3b prevents early deterioration of the lubricant supplied to the surface of the photoconductor 1 caused by electric discharge generated during operation of the charger 2 or the primary transfer rollers 51. Characteristics of boron nitride are not easily changed by the electric discharge and thus the lubricating property of boron nitride is not lost by the electric discharge compared to other types of lubricants. Further, boron nitride prevents a photoconductive layer of the photoconductor 1 from being oxidized and volatilized by the electric discharge. Even a small additive amount of boron nitride provides good lubricating property, thereby effectively preventing chatter of a cleaning blade 8a, which is described later, and problems caused by adherence of the lubricant to the charging roller 2a or the like.

Materials including zinc stearate and boron nitride are compressed to form the solid lubricant 3b. It is to be noted that a method for forming the solid lubricant 3b is not limited to the compression process. Alternatively, the solid lubricant 3b may be formed by melt process. Thus, the solid lubricant 3b has the effects of both zinc stearate and boron nitride.

Although the solid lubricant 3b is consumed by being scraped off by the application roller 3a and thus a thickness of the solid lubricant 3b is reduced over time, the pressing mechanism 3c constantly presses the solid lubricant 3b against the application roller 3a. The application roller 3a supplies the lubricant scraped off from the solid lubricant 3b to the surface of the photoconductor 1 while rotating. Thereafter, the lubricant supplied to the surface of the photoconductor 1 is spread and leveled by a leveling blade 8d that contacts the surface of the photoconductor 1, so that the surface of the photoconductor 1 has a thin layer of the lubricant thereon. As a result, a frictional factor on the surface of the photoconductor 1 is reduced. It is to be noted that the layer of the lubricant adhering to the surface of the photoconductor 1 is too thin to prevent the photoconductor 1 from being charged by the charging roller 2a.

The cleaning device 8 includes a cleaning member, which, in the present illustrative embodiment, is the cleaning blade 8a, a support member 8b, and a toner collection coil 8c. The cleaning blade 8a is constructed of a rubber plate formed of urethane rubber, silicone rubber, or the like, and one end of the cleaning blade 8a contacts the surface of the photoconductor 1 to remove residual toner from the surface of the photoconductor 1 after the primary transfer of the toner image from the photoconductor 1 onto the intermediate transfer belt 56. The cleaning blade 8a is bonded to and supported by the support member 8b formed of metal, plastics, ceramics, or the like, and is disposed opposite the photoconductor 1 at a certain angle. It is to be noted that not only the cleaning blade 8a but also a well-know cleaning member such as a cleaning brush may be used as the cleaning member of the cleaning device 8.

In the present illustrative embodiment, the lubricant applicator 3 is disposed downstream from the cleaning device 8 in the direction of rotation of the photoconductor 1. The lubricant supplied to the surface of the photoconductor 1 by the lubricant applicator 3 is spread across the surface of the photoconductor 1 by the leveling blade 8d so that the lubricant is roughly leveled on the surface of the photoconductor 1.

A description is now given of a detailed configuration of the lubricant applicator 3 according to a first illustrative embodiment.

Figure 4A:
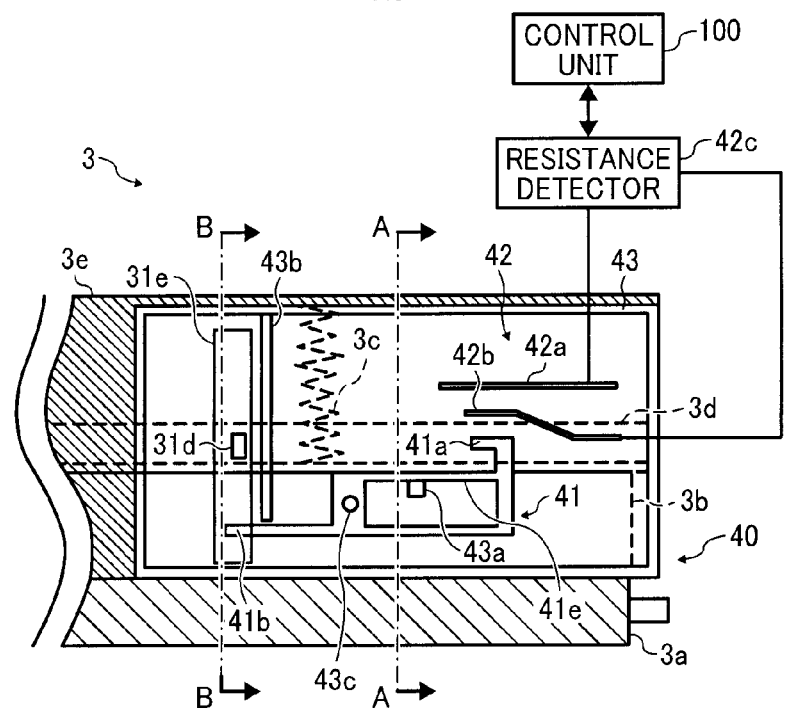
FIG. 4A is a schematic view illustrating an example of a configuration of a lubricant gauge in the early stage of use of a solid lubricant according to a first illustrative embodiment.
Figure 4B:
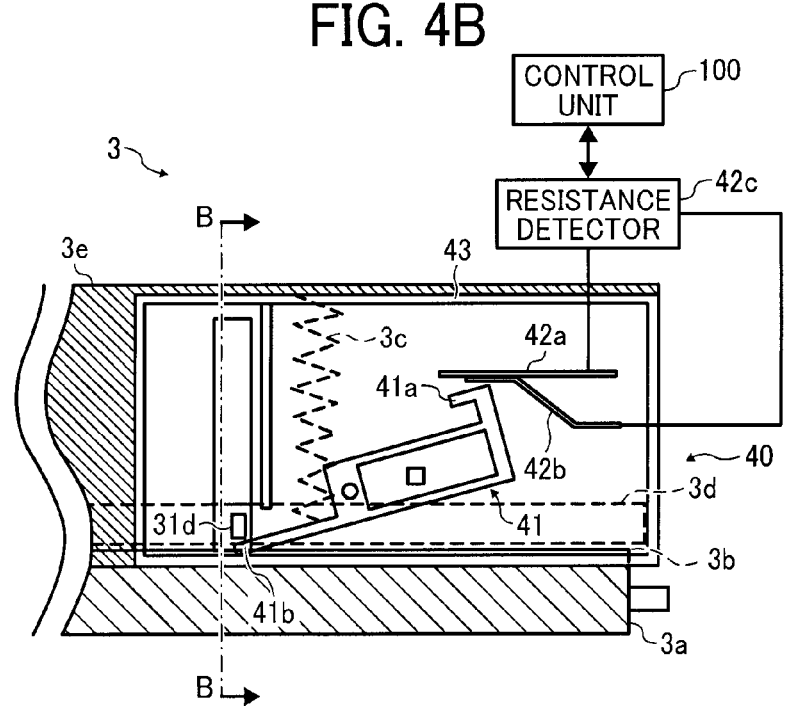
FIG. 4B is a schematic view of the lubricant gauge illustrated in FIG. 4A in a near-end stage of the solid lubricant.
Figure 5:
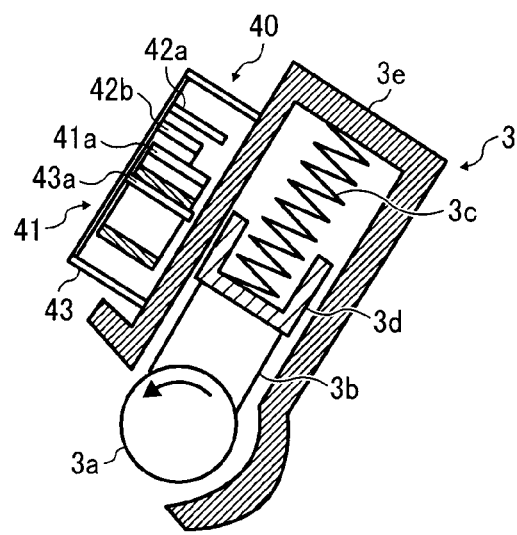
FIG. 5 is a vertical cross-sectional view along line A-A in FIG. 4A.
Figure 6A:
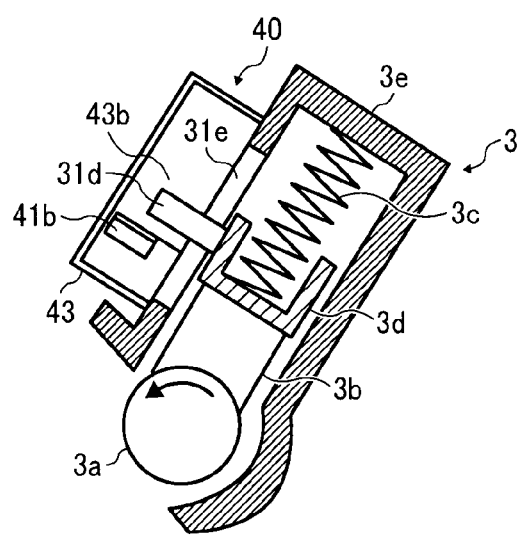
FIG. 6A is a vertical cross-sectional view along line B-B in FIG. 4A.
Figure 6B:
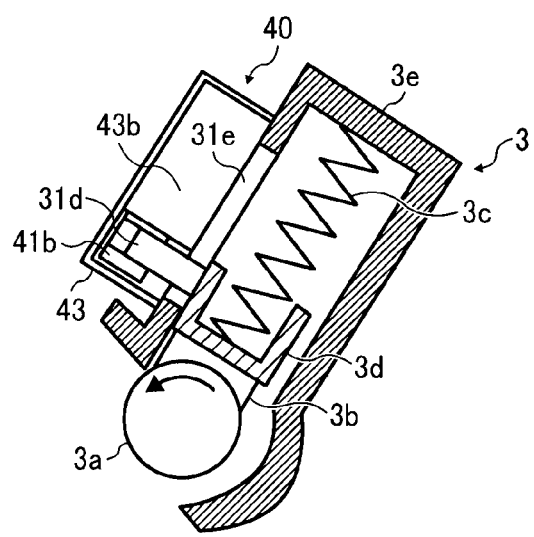
FIG. 6B is a vertical cross-sectional view along line B-B in FIG. 4B.

FIG. 4A is a schematic view illustrating an example of a configuration of a lubricant gauge 40, which is provided to one end of the lubricant applicator 3 in a longitudinal direction thereof, in the early stage of use of the solid lubricant 3b according to the first illustrative embodiment. FIG. 4B is a schematic view of the lubricant gauge 40 illustrated in FIG. 4A in a stage of use of the solid lubricant 3b in which the solid lubricant 3b is almost used up and has only a slight amount remaining (hereinafter referred to as a near-end stage of the solid lubricant 3b). FIG. 5 is a vertical cross-sectional view along line A-A in FIG. 4A. FIG. 6A is a vertical cross-sectional view along line B-B in FIG. 4A. FIG. 6B is a vertical cross-sectional view along line B-B in FIG. 4B. It is to be noted that, although only one end of the lubricant applicator 3 is shown in FIGS. 4A and 4B, both ends of the lubricant applicator 3 in the longitudinal direction have the same basic configuration.

The lubricant applicator 3 further includes a lubricant holder 3d that holds, across the longitudinal direction, an opposite face of the solid lubricant 3b opposite a contact face contacted by the application roller 3a. The lubricant holder 3d is disposed within a casing 3e and is separatably contactable against the application roller 3a. The pressing mechanism 3c, which, in the present illustrative embodiment, is a pressure spring that presses the lubricant holder 3d toward the application roller 3a, is disposed above the lubricant holder 3d within the casing 3e. Thus, the solid lubricant 3b held by the lubricant holder 3d is pressed against the application roller 3a by the pressing mechanism 3c.

A remaining amount detector, which, in the present illustrative embodiment, is the lubricant gauge 40, is disposed near both ends of the solid lubricant 3b in the longitudinal direction. The lubricant gauge 40 is mounted to a lateral face of the casing 3e provided downstream from a contact portion, in which the application roller 3a contacts the solid lubricant 3b, in a direction of rotation of the application roller 3a. The lubricant gauge 40 includes a rotary member 41 and a rotation detector 42 that detects rotation of the rotary member 41. The rotation detector 42 is constructed of a first electrode member 42a, a second electrode member 42b disposed opposite the first electrode member 42a, and a resistance detector 42c. The resistance detector 42c is connected to both the first and second electrode members 42a and 42b, and applies a voltage between the first and second electrode members 42a and 42b to measure an electrical resistance therebetween. The resistance detector 42c is also connected to a control unit 100. The rotary member 41 and the first and second electrode members 42a and 42b are covered with and supported by a cover member 43. The first and second electrode members 42a and 42b are disposed above the rotary member 41.

In the present illustrative embodiment, each of the first and second electrode members 42a and 42b is constructed of a planar conductive material such as sheet metal. The second electrode member 42b is disposed below the first electrode member 42a. The cover member 43 holds the second electrode member 42b such that a left end of the second electrode member 42b in FIGS. 4A and 4B is deformable toward the first electrode member 42a. A free end of the second electrode member 42b that contacts the first electrode member 42a, that is, the left end of the second electrode member 42b in FIGS. 4A and 4B, is positioned close and parallel to the first electrode member 42a. As illustrated in FIGS. 4A and 4B, a left end of the first electrode member 42a extends toward the center of the solid lubricant 3b in the longitudinal direction beyond the free end of the second electrode member 42b. In addition, as illustrated in FIG. 5, a length of the first electrode member 42a is longer than a length of the second electrode member 42b in a direction perpendicular to the lateral face of the cover member 43, and such a configuration allows the first electrode member 42a to have a larger size than the second electrode member 42b at least around a contact portion in which the second electrode member 42b contacts the first electrode member 42a.

An opening 31e extending in a direction of movement of the lubricant holder 3d is formed in the lateral face of the casing 3e provided downstream from the contact portion in which the application roller 3a contacts the solid lubricant 3b. A pressing member, which, in the present illustrative embodiment, is a projection 31d provided to the lubricant holder 3d, penetrates through the opening 31e. The cover member 43 includes a partition wall 43b that divides an internal space encompassed by the cover member 43 into two parts, that is, a first part within which the opening 31e is provided and a second part within which the first and second electrode members 42a and 42b are disposed.

The rotary member 41 is rotatably supported on a shaft 43c provided to the cover member 43. A planar contact part 41b extending leftward in FIGS. 4A and 4B is provided to the left part of the rotary member 41 relative to the shaft 43c, such that a leading end of the contact part 41b is positioned opposite the projection 31d of the lubricant holder 3d. The right part of the rotary member 41 relative to the shaft 43c is box-like in shape and is heavier than the left part having the contact part 41b. Accordingly, the rotary member 41 swings clockwise in FIGS. 4A and 4B by gravity (i.e., under its own weight).

A restriction projection 43a, which is contactable against an inner surface 41e of the box-like part of the rotary member 41 to restrict the rotation of the rotary member 41 by gravity, is provided to the cover member 43. The rotary member 41 further includes a hook-shaped detection part 41a extending upward from an upper right end of the box-like part of the rotary member 41.

As illustrated in FIG. 4A, in the early stage of use of the solid lubricant 3b, the projection 31d provided to the lubricant holder 3d is positioned away from the contact part 41b of the rotary member 41 and the rotary member 41 contacts the restriction protrusions 43a. At this time, the detection part 41a of the rotary member 41 is positioned away from the second electrode member 42b, which is positioned opposite the first electrode member 42a across a predetermined gap. Accordingly, no electric current flows between the first and second electrode members 42a and 42b in such a state even when the resistance detector 42c applies a voltage between the first and second electrode members 42a and 42b, and thus the resistance detector 42c does not measure an electrical resistance.

As the solid lubricant 3b is gradually scraped off by the application roller 3a and is reduced over time, the lubricant holder 3d is moved toward the application roller 3a. Then, as the solid lubricant 3b is consumed, the projection 31d provided to the lubricant holder 3d contacts the contact part 41b of the rotary member 41. When the solid lubricant 3b is further scraped off by the application roller 3a and thus is further reduced, the contact part 41b of the rotary member 41 is pressed by the projection 31d so that the rotary member 41 is rotated counterclockwise, which is opposite a direction in which the rotary member 41 is rotated by gravity. The rotary member 41 is further rotated counterclockwise as the solid lubricant 3b is further scraped off and reduced, so that the detection part 41a of the rotary member 41 contacts the second electrode member 42b. Thereafter, when the solid lubricant 3b is further scraped off and the rotary member 41 is further rotated counterclockwise, the detection part 41a of the rotary member 41 presses the free end of the second electrode member 42b, that is, the left end of the second electrode member 42b in FIGS. 4A and 4B, toward the first electrode member 42a. As a result, the free end of the second electrode member 42b approaches the first electrode member 42a. When the solid lubricant 3b reaches the near-end stage, the rotary member 41 is rotated at a predetermined angle so that the second electrode member 42b contacts the first electrode member 42a as illustrated in FIG. 4B. Accordingly, electrical continuity is established between the first and second electrode members 42a and 42b. Thus, application of a voltage between the first and second electrode members 42a and 42b by the resistance detector 42c generates an electric current between the first and second electrode members 42a and 42b. As a result, the resistance detector 42c measures an electrical resistance so that the rotation of the rotary member 41 by consumption of the solid lubricant 3b is detected.

The control unit 100 monitors the readings taken by the resistance detector 42c. When the electrical resistance thus measured by the resistance detector 42c is less than a threshold value, the control unit 100 determines that the solid lubricant 3b reaches the near-end stage. Then, the control unit 100 reports to an operating unit, not shown, that the solid lubricant 3b is almost used up to prompt a user to replace the solid lubricant 3b with a new solid lubricant. Alternatively, a communication unit, not shown, may be used to notify a service center of replacement for the solid lubricant 3b.

The amount of lubricant supplied to the photoconductor 1 is not constant but varies depending on an area ratio of an image formed on the surface of the photoconductor 1. Specifically, upon the primary transfer of the toner image onto the intermediate transfer belt 56 from the surface of the photoconductor 1, onto which the lubricant is supplied by the lubricant applicator 3, such lubricant may be also transferred onto the intermediate transfer belt 56, together with the toner image, from the surface of the photoconductor 1. Thus, compared to the surface of the photoconductor 1 onto which a toner image with a lower area ratio is formed, the surface of the photoconductor 1 onto which a toner image with a higher area ratio is formed has a smaller amount of lubricant thereon after the primary transfer of the toner image from the surface of the photoconductor 1 onto the intermediate transfer belt 56. As a result, a larger amount of lubricant is supplied to the surface of the photoconductor 1, onto which the toner image with a higher area ratio is formed. For these reasons, consumption of the solid lubricant 3b differs between a case in which the image with a lower area ratio such as a letter is often formed and a case in which the image with a higher area ratio such as a photograph is often formed.

Therefore, unlike the present illustrative embodiment, if the near-end stage of the solid lubricant 3b is determined only by an operating time such as a cumulative distance traveled by the application roller 3a, accurate detection of the near-end stage of the solid lubricant 3b under all usage conditions is not possible. For example, in a case in which the near-end stage of the solid lubricant 3b is determined by a cumulative distance traveled by the application roller 3a for a usage condition in which the solid lubricant 3b is heavily consumed, replacement of the solid lubricant 3b, which is not used up yet under a usage condition in which the solid lubricant 3b is less consumed, may be prompted. Conversely, in a case in which the near-end stage of the solid lubricant 3b is determined by a cumulative distance traveled by the application roller 3a for the usage condition in which the solid lubricant 3b is less consumed, the solid lubricant 3b may be used up before the detection of the near-end stage under the usage condition in which the solid lubricant 3b is heavily consumed.

By contrast, in the present illustrative embodiment, the near-end stage of the solid lubricant 3b is detected by the lubricant gauges 40 based on the height of the solid lubricant 3b. As a result, the near-end stage of the solid lubricant 3b is more accurately detected, regardless of the usage conditions, compared to the configuration in which the cumulative distance traveled by the application roller 3a is used for determining the near-end stage of the solid lubricant 3b.

In addition, in the present illustrative embodiment, electrical continuity (an electrical circuit) between the first and second electrode members 42a and 42b is not established until the rotary member 41 is moved to the position to detect the near-end stage of the solid lubricant 3b, and therefore, no electric current flows between the first and second electrode members 42a and 42b even when a voltage is applied between the first and second electrode members 42a and 42b. As a result, electric power is not consumed each time the detection of the near-end stage of the solid lubricant 3b is performed, thereby reducing power consumption. Further, in the present illustrative embodiment, the first and second electrode members 42a and 42b are formed of a relatively inexpensive material such as sheet metal. Thus, the rotation detector 42 is provided at reduced cost.

As described previously, the lubricant gauge 40 is disposed near both ends of the solid lubricant 3b in the longitudinal direction thereof. Therefore, even when the solid lubricant 3b is consumed at different rates at both ends thereof in the longitudinal direction, upon reaching the near-end stage at one end of the solid lubricant 3b, the rotary member 41 included in the lubricant gauge 40 provided near that end is rotated so that the second electrode member 42b contacts the first electrode member 42a to establish electrical continuity therebetween. Thus, the near-end stage of the solid lubricant 3b at either end thereof is accurately detected, thereby preventing damage to the surface of the photoconductor 1 due to the exhaustion of the solid lubricant 3b.

As described above, the lubricant gauge 40 according to the present illustrative embodiment includes the rotary member 41 that is rotated as the solid lubricant 3b is consumed. The rotary member 41 has the contact part 41b, which is contacted by the projection 31d of the lubricant holder 3d, and the detection part 41a provided opposite the contact part 41b across the shaft 43c. When the rotation detector 42 detects that the detection part 41a is moved to a predetermined position, the near-end stage of the solid lubricant 3b is detected.

The above-described configuration allows the rotation detector 42 to be positioned away from the contact portion in which the solid lubricant 3b and the application roller 3a contact each other. As a result, adherence of powdered lubricant scraped off from the solid lubricant 3b by the application roller 3a to the first and second electrode members 42a and 42b is prevented. Thus, an irregular electrical continuity between the first and second electrode members 42a and 42b caused by adherence of the powdered lubricant to the first and second electrode members 42a and 42b is prevented, thereby accurately detecting the near-end stage of the solid lubricant 3b.

Further, in the present illustrative embodiment, the lubricant gauge 40 is disposed outside the casing 3e. Thus, adherence of scattered powdered lubricant to the first and second electrode members 42a and 42b is further prevented.

In the present illustrative embodiment, the detection part 41a of the rotary member 41 is positioned above the contact part 41b of the rotary member 41, such that the first and second electrode members 42a and 42b are disposed above the rotary member 41. As a result, adherence of lubricant scattered through the opening 31e to the first and second electrode members 42a and 42b is further prevented. In addition, the detection part 41a, which is positioned above the contact part 41b, sufficiently presses the second electrode member 42b, which is disposed above the rotary member 41, against the first electrode member 42a even with a smaller amount of rotation of the rotary member 41.

Scattered powdered lubricant or the like tends to accumulate on upper surfaces of the planar first and second electrode members 42a and 42b. Because the upper surface of the second electrode member 42b contacts the first electrode member 42a, it is necessary to prevent adherence of lubricant to the upper surface of the second electrode member 42b. For this reason, in the present illustrative embodiment, the free end of the second electrode member 42b, which contacts the first electrode member 42a, is positioned close to the first electrode member 42a. As a result, a gap between the free end of the second electrode member 42b and the first electrode member 42a is reduced, thereby suppressing adherence of lubricant to the upper surface of the free end of the second electrode member 42b.

As described previously with reference to FIGS. 4A and 4B, the left end of the first electrode member 42a extends toward the center of the solid lubricant 3b in the longitudinal direction beyond the free end of the second electrode member 42b. In addition, as illustrated in FIG. 5, the length of the first electrode member 42a is longer than the length of the second electrode member 42b in the direction perpendicular to the lateral face of the casing 3e in which the opening 31e is formed. In other words, the first electrode member 42a functions as a canopy so that the lubricant or the like falling from above is caught by the upper surface of the first electrode member 42a and does not fall on the second electrode member 42b. As a result, adherence of lubricant to the upper surface of the second electrode member 42b is prevented. It is to be noted that accumulation of lubricant on the upper surface of the first electrode member 42a does not adversely affect establishment of electrical continuity between the first and second electrode members 42a and 42b.

In the present illustrative embodiment, the partition wall 43b included in the cover member 43 divides the internal space encompassed by the cover member 43 into the first part, within which the opening 31e is provided, and the second part, within which the first and second electrode members 42a and 42b are disposed. As a result, even when the powdered lubricant enters the internal space via the opening 31e, adherence of the powdered lubricant to the first and second electrode members 42a and 42b is further prevented by the partition wall 43b. It is preferable that the cover member 43 and the partition wall 43b be formed together of resin as a single integrated component. Thus, compared to a configuration in which the cover member 43 and the partition wall 43b are individually provided, the number of components is reduced, thereby reducing production cost. Alternatively, the partition wall 43b may be provided to the casing 3e. In such a case, it is preferable that the casing 3e and the partition wall 43b be formed together of resin as a single integrated component, so that the number of components is reduced, thereby reducing production cost. Further alternatively, the cover member 43 and the casing 3e, each having a partition wall, may be combined together so that the internal space encompassed by the cover member 43 is divided into the first part, within which the opening 31e is provided, and the second part, within which the first and second electrode members 42a and 42b are disposed.

The opening 31e and the first and second electrode members 42a and 42b are covered with the cover member 43. Accordingly, the powdered lubricant is prevented from scattering outside the lubricant applicator 3 via the opening 31e, thereby preventing the interior of the image forming apparatus 10 from getting contaminated. In addition, adherence of the scattered toner to the first and second electrode members 42a and 42b is prevented, thereby preventing irregular electrical continuity between the first and second electrode members 42a and 42b.

In the present illustrative embodiment, a direction in which the rotary member 41 is rotated by gravity is opposite to a direction in which the rotary member 41 is rotated as the solid lubricant 3b is consumed. Unlike the present illustrative embodiment, if the rotary member 41 is configured to rotate in the same direction either by gravity or consumption of the solid lubricant 3b, a restriction member constructed of a biasing member such as a spring is further provided to bias the rotary member 41 toward the direction opposite to the direction in which the rotary member 41 is rotated by gravity, such that the rotary member 41 is prevented from being rotated by gravity. In such a configuration, when the projection 31d of the lubricant holder 3d presses against the contact part 41b of the rotary member 41 to rotate the rotary member 41 as the solid lubricant 3b is consumed, a biasing force of the spring is increased. Consequently, as the solid lubricant 3b approaches the near-end stage, a contact pressure of the solid lubricant 3b against the application roller 3a is reduced, thereby reducing an amount of lubricant supplied to the surface of the photoconductor 1.

By contrast, in the present illustrative embodiment, the direction in which the rotary member 41 is rotated by gravity is opposite to the direction in which the rotary member 41 is rotated as the solid lubricant 3b is consumed, thereby eliminating provision of the spring described above. Therefore, the contact pressure of the solid lubricant 3b against the application roller 3a is kept constant. As a result, a fluctuation in the amount of lubricant supplied to the surface of the photoconductor 1 is suppressed compared to the case in which the rotary member 41 is rotated in the same direction either by gravity or consumption of the solid lubricant 3b.

In the present illustrative embodiment, the cover member 43 holds the first and second electrode members 42a and 42b and the rotary member 41. Because the first and second electrode members 42a and 42b and the rotary member 41 are supported by the same member, that is, the cover member 43, accumulation of tolerances is minimized. Accordingly, the first and second electrode members 42a and 42b and the rotary member 41 are accurately positioned relative to one another. As a result, the second electrode member 42b reliably contacts the first electrode member 42a when the solid lubricant 3b reaches the near-end stage, thereby accurately detecting the near-end stage of the solid lubricant 3b. In addition, the lubricant gauge 40 is easily detached from the lubricant applicator 3 by simply removing the cover member 43 from the casing 3e, thereby facilitating replacement of the lubricant gauge 40.

In the present illustrative embodiment, the application roller 3a scrapes off the solid lubricant 3b to supply the lubricant to the surface of the photoconductor 1 while rotating. Thus, during the application of lubricant to the surface of the photoconductor 1 by the application roller 3a, the solid lubricant 3b receives a force in the direction of rotation of the application roller 3a, that is, a leftward force in FIGS. 6A and 6B. In addition, the lubricant holder 3d is configured to be movable within the casing 3e. In other words, the lubricant holder 3d is accommodated within the casing 3e with play. Such a configuration moves the lubricant holder 3d, which holds the solid lubricant 3b, in a direction in which the application roller 3a scrapes off the solid lubricant 3b, that is, leftward in FIGS. 6A and 6B, when the solid lubricant 3b receives the force in the direction of rotation of the application roller 3a. Unlike the present illustrative embodiment, if the lubricant gauge 40 is mounted to a lateral face of the casing 3e provided upstream from the contact portion in which the solid lubricant 3b is contacted by the application roller 3a, the leftward movement of the lubricant holder 3d in the direction in which the application roller 3a scrapes off the solid lubricant 3b may prevent the projection 31d of the lubricant holder 3d from contacting the contact part 41b of the rotary member 41. Consequently, the rotary member 41 is not rotated even when the solid lubricant 3b reaches the near-end stage.

By contrast, in the present illustrative embodiment, the lubricant gauge 40 is mounted to the lateral face of the casing 3e provided downstream from the contact portion in which the application roller 3a contacts the solid lubricant 3b in the direction of rotation of the application roller 3a. As a result, the projection 31d securely contacts the contact part 41b of the rotary member 41, thereby reliably detecting the near-end stage of the solid lubricant 3b. In addition, both the lubricant holder 3d and the solid lubricant 3b are moved in the direction of rotation of the application roller 3a, that is, leftward in FIGS. 6A and 6B, during the application of lubricant to the surface of the photoconductor 1 by the application roller 3a. Accordingly, the opening 31e is covered with the lubricant holder 3d and the solid lubricant 3b. As a result, the powdered lubricant accumulating within the casing 3e is prevented from scattering outside the casing 3e through the opening 31e.

It is to be noted that, in the present illustrative embodiment, the lubricant gauge 40 detects a state in which the solid lubricant 3b still has a slight amount remaining to be supplied to the surface of the photoconductor 1 for predetermined number of sequences of image formation. If the lubricant gauge 40 detects the last stage of use of the solid lubricant 3b immediately before exhaustion of the solid lubricant 3b, image formation is prohibited until the solid lubricant 3b is replaced with a new solid lubricant 3b in order to prevent irregular image formation caused by exhaustion of the solid lubricant 3b, thereby causing downtime.

By contrast, in the present illustrative embodiment, the near-end stage of the solid lubricant 3b is detected as described above. Accordingly, the lubricant is still supplied to the surface of the photoconductor 1 for the predetermined number of sequences of image formation even after the detection of the near-end stage, thereby securely protecting the surface of the photoconductor 1. As a result, image formation is performed without downtime even after the detection until the replacement of the solid lubricant 3b. However, if image formation is performed at the predetermined number of sequences before the replacement of the solid lubricant 3b, the solid lubricant 3b is used up, causing the problems caused by the exhaustion of the solid lubricant 3b. To prevent these problems, when the near-end stage of the solid lubricant 3b is detected, the cumulative distance traveled by the application roller 3a, the number of sequences of image formation performed, or the like is monitored. Then, when the cumulative distance traveled by the application roller 3a, the number of sequences of image formation performed, or the like reaches a predetermined threshold, it is determined that the solid lubricant 3b reaches the last stage of use, so that image formation is prohibited.

As described previously, the application roller 3a scrapes off the solid lubricant 3b to supply the lubricant thus scraped off to the surface of the photoconductor 1 while rotating. Thus, during the application of lubricant to the surface of the photoconductor 1 by the application roller 3a, the solid lubricant 3b receives a force in the direction of rotation of the application roller 3a, that is, a leftward force in FIGS. 6A and 6B. In addition, the lubricant holder 3d is configured to be movable within the casing 3e. In other words, the lubricant holder 3d is accommodated within the casing 3e with play. The above-described configuration may incline the lubricant holder 3d holding the solid lubricant 3b counterclockwise in FIGS. 6A and 6B, which corresponds to the direction in which the application roller 3a scrapes off the solid lubricant 3b, when the solid lubricant 3b receives the leftward force in the direction of rotation of the application roller 3a. In the present illustrative embodiment, the projection 31d is mounted to a lateral face of the lubricant holder 3d provided downstream in the direction of rotation of the application roller 3a. Consequently, when the lubricant holder 3d tilts as described above, the projection 31d may press the rotary member 41 and thus electrical continuity is established between the first and second electrode members 42a and 42b before the solid lubricant 3b reaches the near-end stage. As a result, the control unit 100 erroneously detects the near-end stage of the solid lubricant 3b.

In addition, during the application of lubricant, the solid lubricant 3b vibrates against the rotation of the application roller 3a due to load fluctuation at the contact portion in which the application roller 3a contacts the solid lubricant 3b. In particular, the configuration of the present illustrative embodiment, in which a direction of gravity of the solid lubricant 3b is opposite to the direction of rotation of the application roller 3a against the solid lubricant 3b, increases the vibration of the solid lubricant 3b caused by the load fluctuation. Further, fluctuation in the rotation of the application roller 3a also vibrates the solid lubricant 3b. Consequently, even if the lubricant holder 3d does not tilt during the application of lubricant, a force of the projection 31d that presses the rotary member 41 in the near-end stage of the solid lubricant 3b changes due to the vibration of the solid lubricant 3b. As a result, the force in which the rotary member 41 presses the second electrode member 42b against the first electrode member 42a varies, causing irregular contact of the second electrode member 42b with the first electrode member 42a. Consequently, electrical continuity between the first and second electrode members 42a and 42b is repeatedly established and broken. Therefore, the vibration of the solid lubricant 3b may hinder establishment of electrical continuity between the first and second electrode members 42a and 42b and thus detection of the near-end stage of the solid lubricant 3b even when the solid lubricant 3b reaches the near-end stage. Further, irregular contact of the second electrode member 42b with the first electrode member 42a caused by the vibration of the solid lubricant 3b may generate noise or the like, and such noise or the like may adversely affect establishment of electrical continuity between the first and second electrode members 42a and 42b. Consequently, an amount of electricity is increased in order to prevent the noise from adversely affecting establishment of electrical continuity between the first and second electrode members 42a and 42b. For these reasons, in the present illustrative embodiment, the near-end stage of the solid lubricant 3b is detected when the application roller 3a is not rotated and thus the lubricant is not supplied to the surface of the photoconductor 1.

Figure 7:
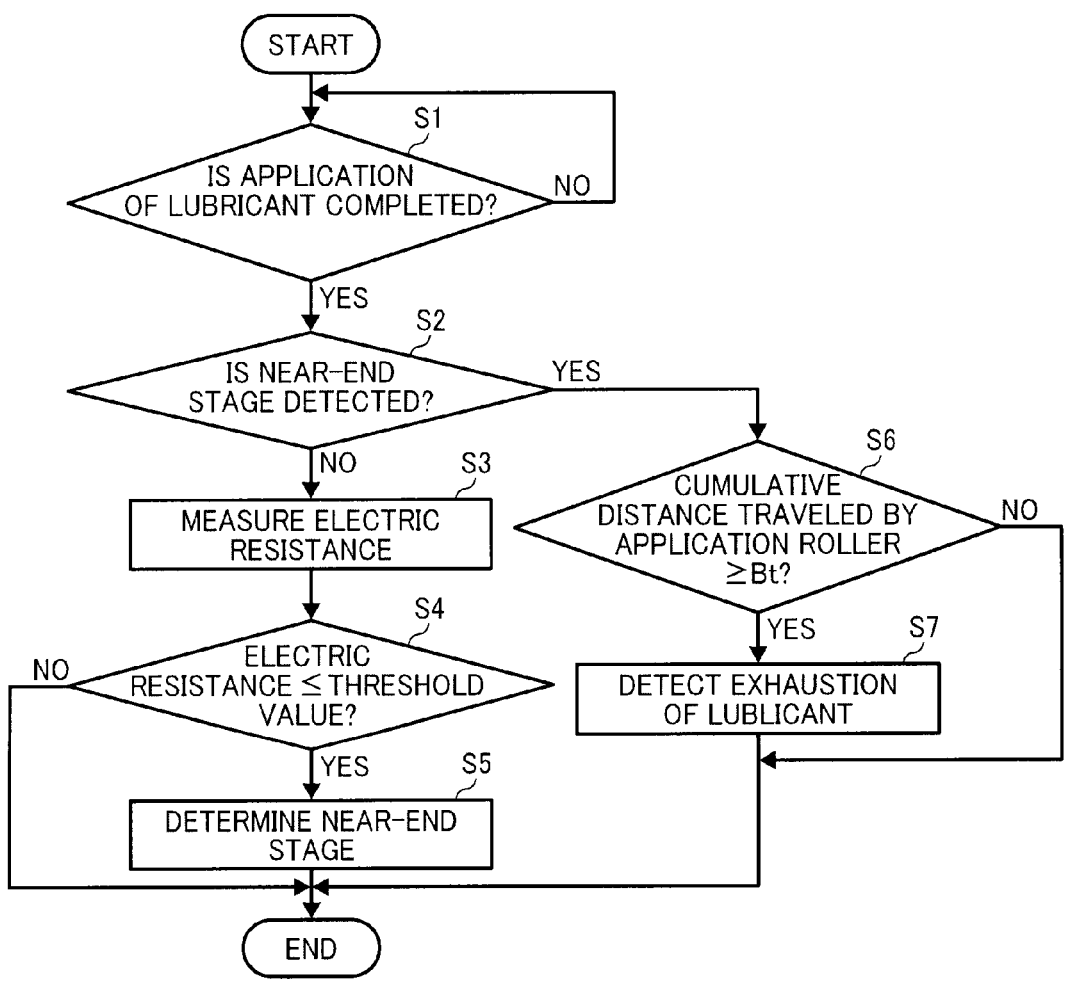
FIG. 7 is a flowchart illustrating steps in a process of detecting the near-end stage of the solid lubricant.

FIG. 7 is a flowchart illustrating steps in a process of detecting the near-end stage of the solid lubricant 3b.

At step S1, the control unit 100 checks whether or not the application of lubricant to the surface of the photoconductor 1 by the application roller 3a is completed. At this time, in a case in which the application roller 3a is rotatively driven, whether a drive motor, not shown, that rotatively drives the application roller 3a is turned off is detected to detect completion of the application of lubricant. Alternatively, in a case in which the application roller 3a is rotated as the photoconductor 1 rotates, whether a drive motor, not shown, that rotatively drives the photoconductor 1 is turned off is detected to detect completion of the application of lubricant. Further alternatively, an encoder or the like that detects completion of the rotation of the application roller 3a may be used to detect completion of the application of lubricant.

When the application of lubricant is completed (YES at S1), the process proceeds to step S2 so that the control unit 100 determines whether or not the near-end stage of the solid lubricant 3b is detected. When the near-end stage of the solid lubricant 3b is not detected (NO at S2), the process proceeds to step S3 so that a voltage is applied between the first and second electrode members 42a and 42b to measure an electrical resistance using the resistance detector 42c. At step S4, the control unit 100 determines whether or not the electrical resistance detected by the resistance detector 42c is less than a threshold value. When the electrical resistance thus detected is less than the threshold value (YES at S4), the process proceeds to step S5 to determine that the solid lubricant 3b reaches the near-end stage and notify the user of the near-end stage of the solid lubricant 3b.

Meanwhile, when the near-end stage of the solid lubricant 3b is detected (YES at S2), the process proceeds to step S6 to determine whether or not a cumulative distance traveled by the application roller 3a after the detection of the near-end stage is greater than a threshold value Bt. When the cumulative distance traveled by the application roller 3a is greater than the threshold value Bt (YES at S6), the process proceeds to step S7 so that the control unit 100 detects that the solid lubricant 3b is used up and prohibits image formation.

As described above, the amount of solid lubricant 3b is detected after the completion of application of lubricant to the surface of the photoconductor 1 in a state in which the lubricant holder 3d is not tilted, thereby accurately detecting the amount of solid lubricant 3b remaining. In addition, in the present illustrative embodiment, the amount of solid lubricant 3b is detected in a state in which the solid lubricant 3b does not vibrate. Accordingly, the second electrode member 42b securely contacts the first electrode member 42a in the near-end stage of the solid lubricant 3b, thereby accurately detecting the near-end stage of the solid lubricant 3b. Further, establishment of the electrical continuity between the first and second electrode members 42a and 42b is reliably detected without applying a high voltage between the first and second electrode members 42a and 42b, thereby minimizing power consumption. Although the amount of the solid lubricant 3b is detected after the completion of application of lubricant in the above-described example, alternatively, it may be detected before the application of lubricant to the surface of the photoconductor 1. Further alternatively, the last stage of use of the solid lubricant 3b may be detected each time after the detection of the near-end stage of the solid lubricant 3b.

In a usage condition in which an image with a lower area ratio is often formed, powdered lubricant, which is not supplied to the surface of the photoconductor 1 from the application roller 3a, accumulates within the casing 3e. Consequently, a part of the lubricant accumulating within the casing 3e scatters outside the casing 3e through the opening 31e. As a result, the powdered lubricant may enter, through a communication part formed in the partition wall 43b through which the contact part 41b of the rotary member 41 penetrates, the part of the internal space encompassed by the cover member 43 in which the first and second electrode members 42a and 42b are disposed. Consequently, such lubricant may adhere to the first or second electrode member 42a or 42b and cause irregular electrical continuity between the first and second electrode members 42a and 42b, resulting in erroneous detection of the near-end stage of the solid lubricant 3b. As a result, the solid lubricant 3b may be used up without the near-end stage being detected, and thus the surface of the photoconductor 1 may not be protected with the lubricant. To prevent the above-described problems, the near-end stage of the solid lubricant 3b may be detected based on both the cumulative distance traveled by the application roller 3a and establishment of the electrical continuity between the first and second electrode members 42a and 42b.

Figure 8:
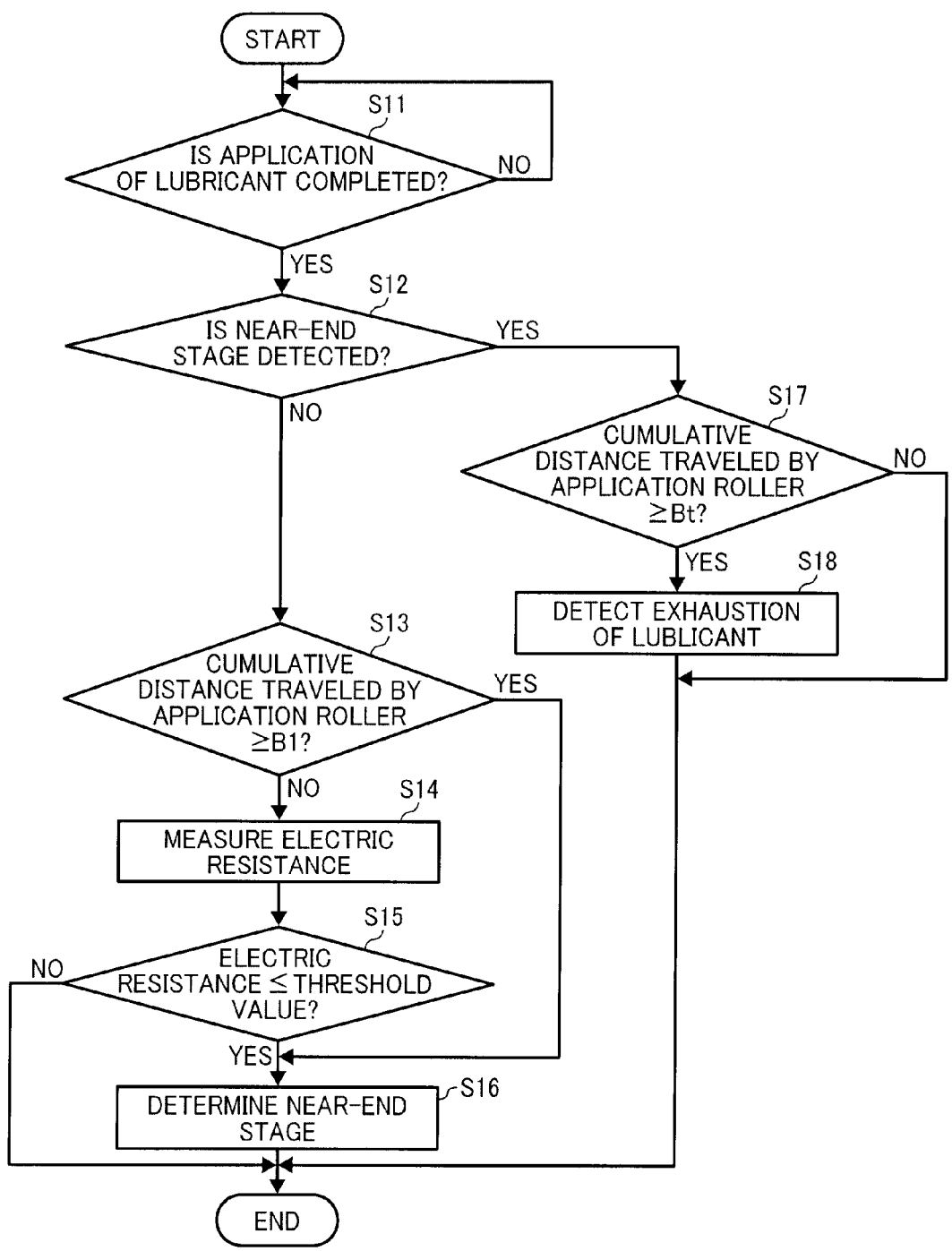
FIG. 8 is a flowchart illustrating steps in a process of detecting the near-end stage of the solid lubricant based on both a result detected by the lubricant gauge and a cumulative distance traveled by an application roller.

FIG. 8 is a flowchart illustrating steps in a process of detecting the near-end stage of the solid lubricant 3b based on both the result detected by the lubricant gauge 40 and the cumulative distance traveled by the application roller 3a.

At step S11, the control unit 100 checks whether or not the application of lubricant to the surface of the photoconductor 1 by the application roller 3a is completed. When the application of lubricant is completed (YES at S11), the process proceeds to step S12 to determine whether or not the lubricant gauge 40 detects the near-end stage of the solid lubricant 3b. When the lubricant gauge 40 does not detect the near-end stage of the solid lubricant 3b (NO at S12), the process proceeds to step S13 to check whether or not the cumulative distance traveled by the application roller 3a is greater than a threshold value B1. When the cumulative distance traveled by the application roller 3a is less than the threshold value B1 (NO at S13), the process proceeds to step S14 so that the resistance detector 42c measures an electrical resistance. At step S15, the control unit 100 checks whether or not the electrical resistance thus measured by the resistance detector 42c is less than a threshold value. When the electrical resistance thus measured is less than the threshold value and thus the electrical continuity is established between the first and second electrode members 42a and 42b (YES at S15), at step S16 the control unit 100 determines that the solid lubricant 3b reaches the near-end stage and notifies the user of the near-end stage of the solid lubricant 3b.

When the cumulative distance traveled by the application roller 3a is greater than the threshold value B1 (YES at S13), the process proceeds to step S16 so that the control unit 100 determines that the solid lubricant 3b reaches the near-end stage and notifies the user of the near-end stage of the solid lubricant 3b.

Meanwhile, when the near-end stage of the solid lubricant 3b is detected (YES at S12), the process proceeds to step S17 to determine whether or not a cumulative distance traveled by the application roller 3a after the detection of the near-end stage is greater than a threshold value Bt. When the cumulative distance traveled by the application roller 3a is greater than the threshold value Bt (YES at S17), the process proceeds to step S18 so that the control unit 100 detects that the solid lubricant 3b is used up and prohibits image formation.

Figure 9:
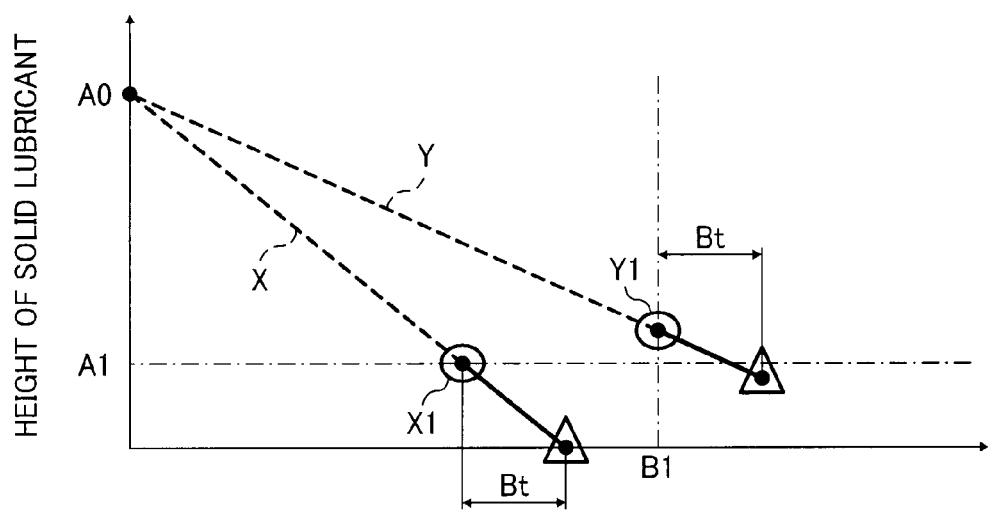
FIG. 9 is a graph showing a relation between a transition in an amount of solid lubricant and a timing to detect the near-end stage of the solid lubricant.

FIG. 9 is a graph showing a relation between a transition in the amount of solid lubricant 3b and a timing to detect the near-end stage of the solid lubricant 3b. In FIG. 9, electrical continuity is established between the first and second electrode members 42a and 42b when the height of the solid lubricant 3b reaches a value A1.

Under a normal usage condition indicated by broken line X in FIG. 9, electrical continuity is established between the first and second electrode members 42a and 42b at a timing X1 before the cumulative distance traveled by the application roller 3a has the threshold value B1, so that the near-end stage of the solid lubricant 3b is detected at the timing X1. Meanwhile, under the usage condition in which an image with a lower area ratio is often formed, which is indicated by broken line Y in FIG. 9, the cumulative distance traveled by the application roller 3a reaches the threshold value B1 at a timing Y1 before the electrical continuity is established between the first and second electrode members 42a and 42b, so that the near-end stage of the solid lubricant 3b is detected at the timing Y1. With regard to the normal usage condition, when the cumulative distance traveled by the application roller 3a reaches the threshold value Bt after the detection of the near-end stage of the solid lubricant 3b, the control unit 100 determines that the solid lubricant 3b reaches the last stage of use and prohibits image formation.

As described above, under the usage condition in which an image with a lower area ratio is often formed, the near-end stage of the solid lubricant 3b may not be detected by the lubricant gauge 40, and therefore, the cumulative distance traveled by the application roller 3a is also used to reliably detect the near-end stage of the solid lubricant 3b. Thus, the near-end stage of the solid lubricant 3b is reliably detected, thereby securely protecting the surface of the photoconductor 1 with the lubricant.

Alternatively, a rotation time of the application roller 3a may be measured to detect the near-end stage of the solid lubricant 3b. In a configuration in which the number of rotation of the application roller 3a is controlled based on environmental changes or the like, the cumulative distance traveled by the application roller 3a is measured to more accurately predict the near-end stage of the solid lubricant 3b.

A description is now given of the lubricant gauge 40 according to a variation of the first illustrative embodiment.

Figure 10A:
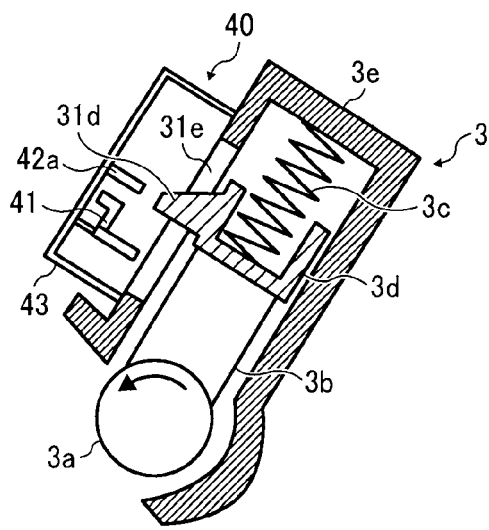
FIG. 10A is a vertical cross-sectional view illustrating an example of a configuration of a lubricant gauge in the early stage of use of the solid lubricant according to a variation of the first illustrative embodiment.
Figure 10B:
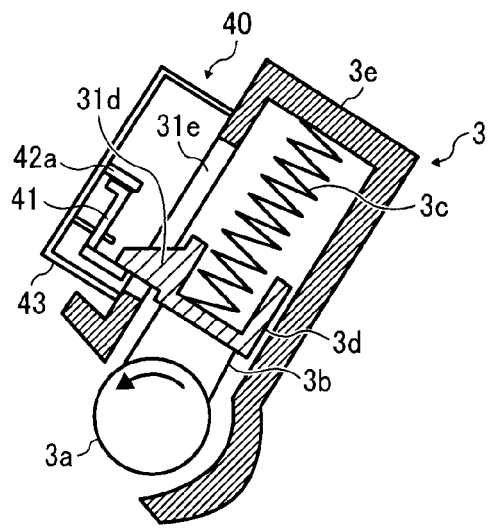
FIG. 10B is a vertical cross-sectional view of the lubricant gauge illustrated in FIG. 10A in the near-end stage of the solid lubricant.
Figure 11A:
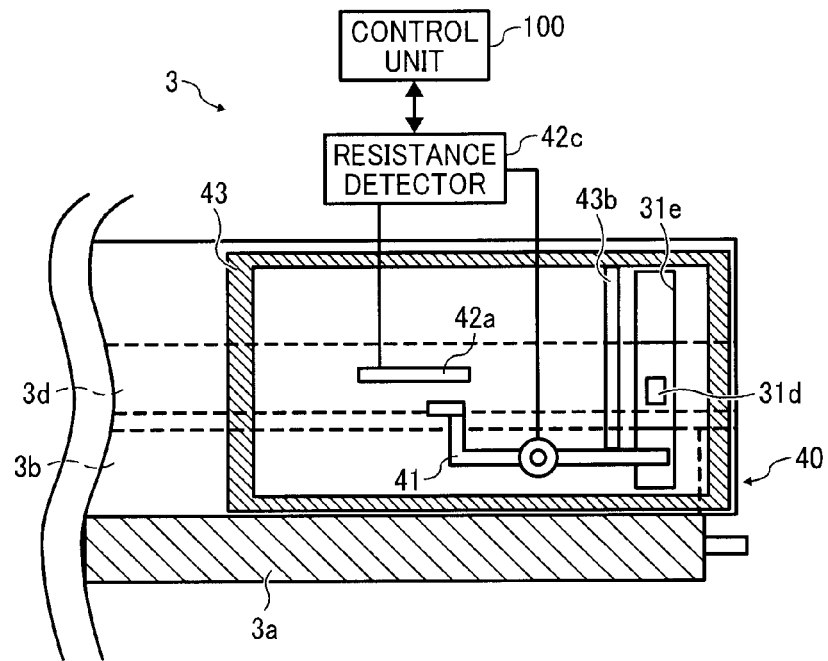
FIG. 11A is a schematic view of the lubricant gauge illustrated in FIG. 10A.
Figure 11B:
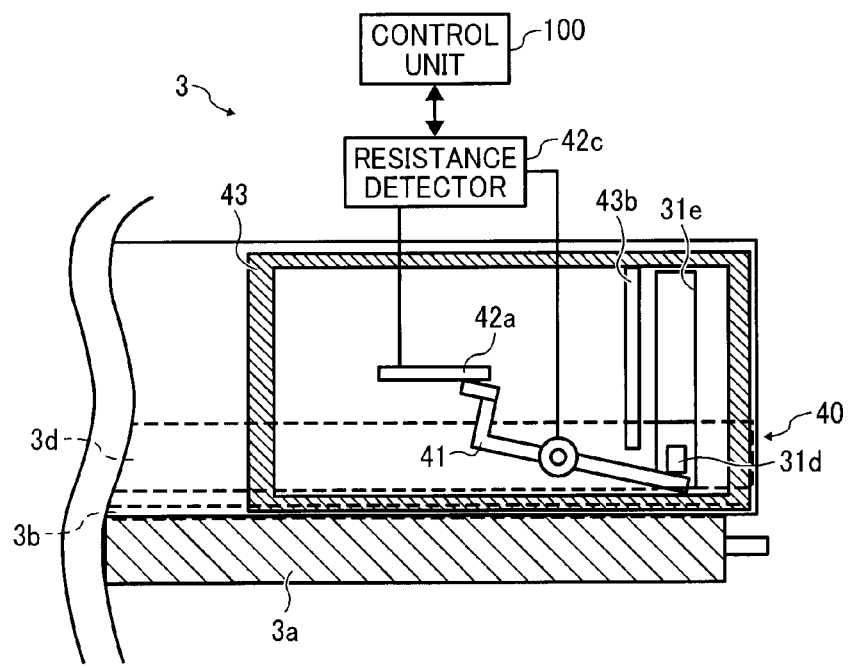
FIG. 11B is a schematic view of the lubricant gauge illustrated in FIG. 10B.

FIG. 10A is a vertical cross-sectional view illustrating an example of a configuration of the lubricant gauge 40 in the early stage of use of the solid lubricant 3b according to the variation of the first illustrative embodiment. FIG. 10B is a vertical cross-sectional view of the lubricant gauge 40 illustrated in FIG. 10A in the near-end stage of the solid lubricant 3b. FIG. 11A is a schematic view of the lubricant gauge 40 illustrated in FIG. 10A. FIG. 11B is a schematic view of the lubricant gauge 40 illustrated in FIG. 10B. It is to be noted that the partition wall 43b is omitted in FIGS. 10A and 10B for ease of illustration.

In the lubricant gauge 40 according to the variation of the first illustrative embodiment, the rotary member 41 is constructed of a conductive member and therefore functions as the second electrode member 42b, which is eliminated. The resistance detector 42c is connected to the first electrode member 42a and the rotary member 41.

As illustrated in FIG. 11A, in the early stage of use of the solid lubricant 3b, the rotary member 41 abuts the partition wall 43b so that the rotation of the rotary member 41 by gravity is restricted by the partition wall 43b. At this time, the rotary member 41 is positioned away from the first electrode member 42a as illustrated in FIGS. 10A and 11A. Accordingly, no electric current flows between the first electrode member 42a and the rotary member 41 even when the resistance detector 42c applies a voltage between the first electrode member 42a and the rotary member 41, and thus the resistance detector 42c does not measure an electrical resistance.

When the solid lubricant 3b reaches the near-end stage so that the projection 31d of the lubricant holder 3d presses the rotary member 41 to rotate the rotary member 41, the left end of the rotary member 41 contacts the first electrode member 42a as illustrated in FIG. 11B. Accordingly, electrical continuity is established between the first electrode member 42a and the rotary member 41. Thus, application of a voltage between the first electrode member 42a and the rotary member 41 by the resistance detector 42c generates an electric current between the first electrode member 42a and the rotary member 41. As a result, the resistance detector 42c measures an electrical resistance so that the rotation of the rotary member 41 by consumption of the solid lubricant 3b is detected, and thus detecting the near-end stage of the solid lubricant 3b.

According to the variation of the first illustrative embodiment, the second electrode member 42b is eliminated, thereby reducing the number of components and production cost.

A description is now given of the lubricant applicator 3 according to a second illustrative embodiment.

Figure 12A:
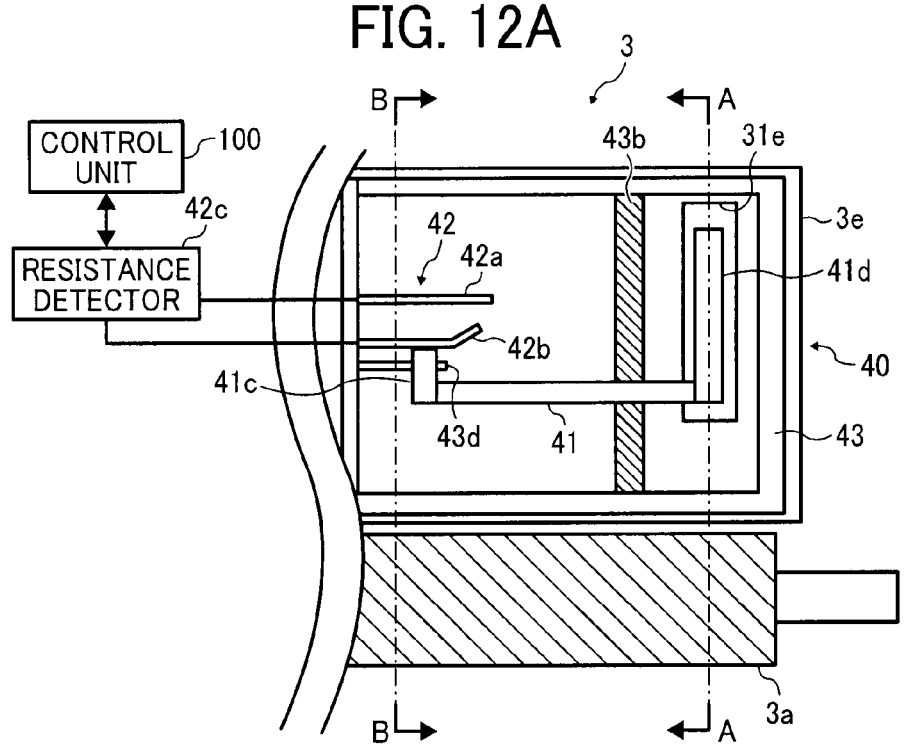
FIG. 12A is a schematic view illustrating an example of a configuration of a lubricant gauge in the early stage of use of the solid lubricant according to a second illustrative embodiment.
Figure 12B:
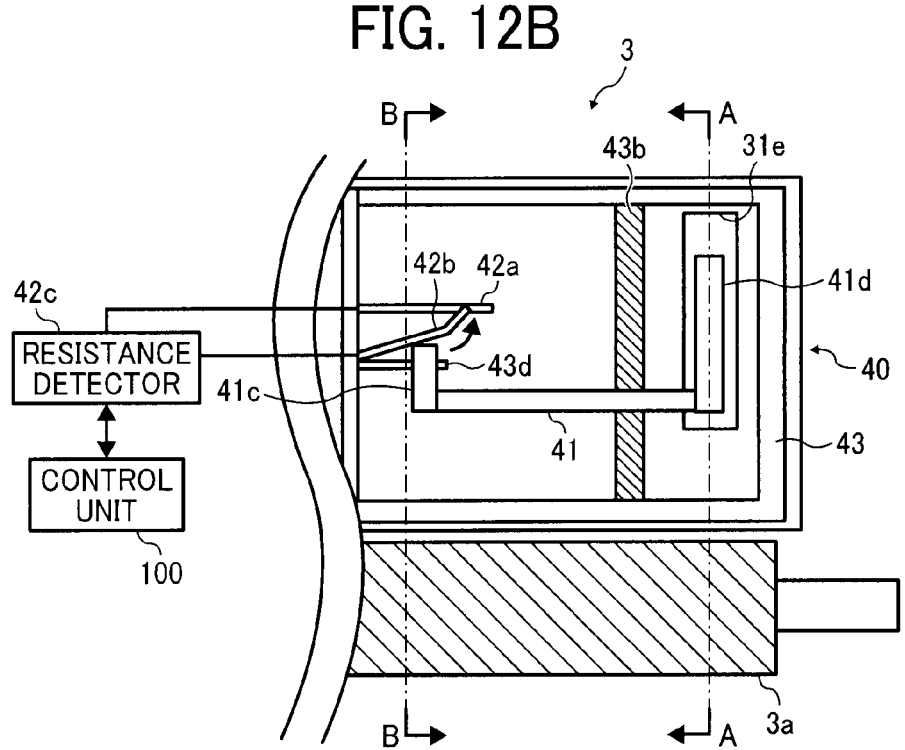
FIG. 12B is a schematic view of the lubricant gauge illustrated in FIG. 12A in the near-end stage of the solid lubricant.
Figure 13A:
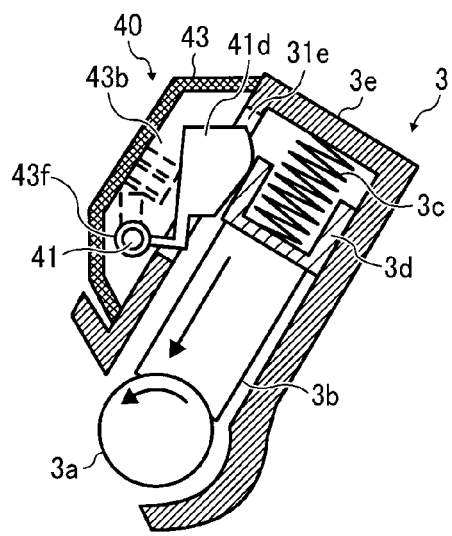
FIG. 13A is a vertical cross-sectional view along line A-A in FIG. 12A.
Figure 13B:
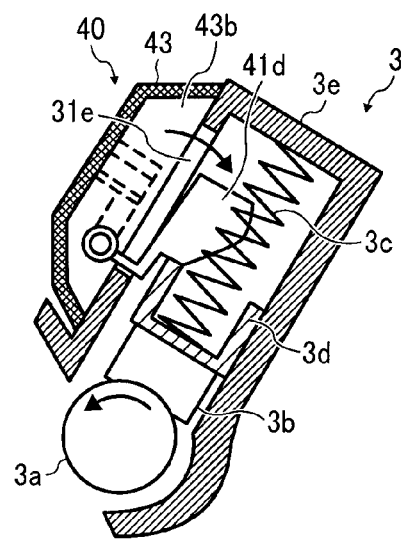
FIG. 13B is a vertical cross-sectional view along line A-A in FIG. 12B.
Figure 14A:
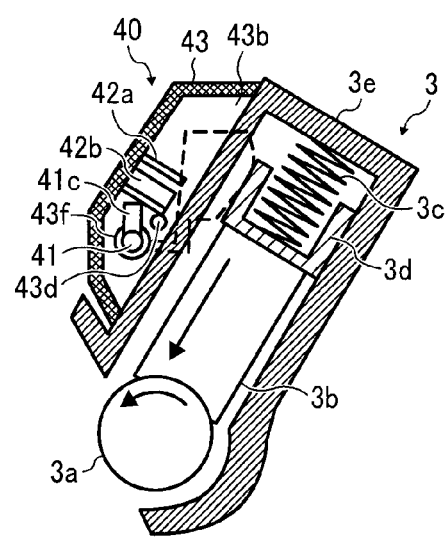
FIG. 14A is a vertical cross-sectional view along line B-B in FIG. 12A.
Figure 14B:
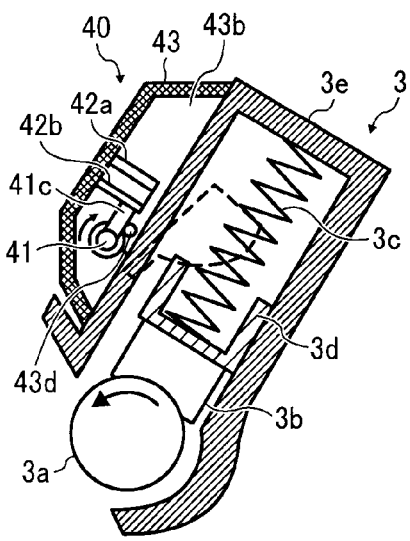
FIG. 14B is a vertical cross-sectional view along line B-B in FIG. 12B.

FIG. 12A is a schematic view illustrating an example of a configuration of the lubricant gauge 40 in the early stage of use of the solid lubricant 3b according to the second illustrative embodiment. FIG. 12B is a schematic view of the lubricant gauge 40 illustrated in FIG. 12A in the near-end stage of the solid lubricant 3b. FIG. 13A is a vertical cross-sectional view along line A-A in FIG. 12A. FIG. 13B is a vertical cross-sectional view along line A-A in FIG. 12B. FIG. 14A is a vertical cross-sectional view along line B-B in FIG. 12A. FIG. 14B is a vertical cross-sectional view along line B-B in FIG. 12B. Although only one end of the lubricant applicator 3 is shown in FIGS. 12A and 12B, both ends of the lubricant applicator 3 in the longitudinal direction have the same basic configuration.

It is to be noted that, to avoid repetition, only the differences from the first illustrative embodiment are described below.

In the second illustrative embodiment, each of the first and second electrode members 42a and 42b of the rotation detector 42 is constructed of a planar conductive material such as sheet metal, and the cover member 43 holds the second electrode member 42b such that a right end of the second electrode member 42b in FIGS. 12A and 12B is deformable toward the first electrode member 42a. The right end of the second electrode member 42b, that is, a free end of the second electrode member 42b according to the second illustrative embodiment, is bent toward the first electrode member 42a.

In a manner similar to the first illustrative embodiment, the opening 31e extending in the direction of movement of the lubricant holder 3d is formed in the lateral face of the casing 3e provided downstream from the contact portion in which the application roller 3a contacts the solid lubricant 3b. In the second illustrative embodiment, a contact part 41d that penetrates through the opening 31e to contact the lubricant holder 3d is provided to one end of the rotary member 41, that is, the right end of the rotary member 41 in FIGS. 12A and 12B. A detection part 41c that presses the second electrode member 42b against the first electrode member 42a when the rotary member 41 is rotated is provided to the other end of the rotary member 41 opposite the contact part 41d, that is, the left end of the rotary member 41 in FIGS. 12A and 12B. Differing from the first illustrative embodiment, the pressing member, that is, the projection 31d, is not provided to the lubricant holder 3d according to the second illustrative embodiment.

As shown in FIGS. 13A and 13B, the contact part 41d of the rotary member 41 is constructed of an extending portion extending from a shaft of the rotary member 41 toward the opening 31e by a predetermined length and a planar portion extending in the vertical direction from a leading end of the extending portion perpendicular to the longitudinal direction of the solid lubricant 3b. This configuration of the contact part 41d rotates the rotary member 41 clockwise in FIGS. 13A through 14B by gravity. In the second illustrative embodiment, as illustrated in FIGS. 13A through 14B, the lubricant applicator 3 is angled clockwise relative to the vertical direction, and the lubricant gauge 40 is mounted to the lateral face of the casing 3e positioned above the lubricant holder 3d. Accordingly, the rotation of the rotary member 41 by gravity causes the contact part 41d to contact the lubricant holder 3d.

Similar to the first illustrative embodiment, the cover member 43 includes the partition wall 43b that divides the internal space encompassed by the cover member 43 into two parts, that is, the first part within which the opening 31e is provided and the second part within which the first and second electrode members 42a and 42b are disposed. In the second illustrative embodiment, the partition wall 43b has a through-hole 43f, through which the rotary member 41 penetrates. The end of the rotary member 41 having the contact part 41d is positioned in the first part of the internal space within which the opening 31e is provided. The opposite end of the rotary member 41 having the detection part 41c is positioned in the second part of the internal space within which the first and second electrode members 42a and 42b are disposed.

A restriction member 43d that restricts the rotation of the rotary member 41 is provided to a lateral wall of the cover member 43. The restriction member 43d extends from a left lateral wall of the cover member 43 toward the rotary member 41 in FIGS. 12A and 12B. In the early stage of use of the solid lubricant 3b, a leading end of the restriction member 43d is disposed opposite the detection part 41c of the rotary member 41 across a predetermined gap as illustrated in FIG. 14A.

As illustrated in FIG. 13A, in the early stage of use of the solid lubricant 3b, the contact part 41d of the rotary member 41 abuts the lubricant holder 3d so that the rotation of the rotary member 41 by gravity is restricted by the lubricant holder 3d. At this time, the detection part 41c of the rotary member 41 does not press against the second electrode member 42b, so that the second electrode member 42b is positioned away from the first electrode member 42a as illustrated in FIG. 14A. Accordingly, no electric current flows between the first and second electrode members 42a and 42b in such a state even when the resistance detector 42c applies a voltage between the first and second electrode members 42a and 42b, and thus the resistance detector 42c does not measure an electrical resistance.

As the solid lubricant 3b is gradually scraped off by the application roller 3a and is reduced over time, the lubricant holder 3d is moved toward the application roller 3a. Then, when the solid lubricant 3b reaches the near-end stage, the contact part 41d is separated from the lateral wall of the lubricant holder 3d as illustrated in FIG. 13B. Accordingly, the rotary member 41 is rotated by gravity so that the detection part 41c of the rotary member 41 presses the second electrode member 42b as illustrated in FIG. 14B. As a result, the second electrode member 42b is bent toward the first electrode member 42a so that the free end of the second electrode member 42b contacts the first electrode member 42a as illustrated in FIG. 12B. Accordingly, electrical continuity is established between the first and second electrode members 42a and 42b. Thus, application of a voltage between the first and second electrode members 42a and 42b by the resistance detector 42c generates an electric current between the first and second electrode members 42a and 42b. As a result, the resistance detector 42c measures an electrical resistance so that the near-end stage of the solid lubricant 3b is detected.

Similar to the first illustrative embodiment, the control unit 100 monitors the readings taken by the resistance detector 42c. When the electrical resistance thus measured by the resistance detector 42c is less than a threshold value, the control unit 100 determines that the solid lubricant 3b reaches the near-end stage. Then, the control unit 100 reports to an operating unit, not shown, that the solid lubricant 3b is almost used up to prompt the user to replace the solid lubricant 3b with a new solid lubricant. Alternatively, a communication unit, not shown, may be used to notify a service center of replacement for the solid lubricant 3b.

In the present illustrative embodiment, electrical continuity between the first and second electrode members 42a and 42b is not established until the solid lubricant 3b reaches the near-end stage. Therefore, no electric current flows between the first and second electrode members 42a and 42b in such a state even when a voltage is applied between the first and second electrode members 42a and 42b. As a result, electric power is not consumed each time the detection of the near-end stage of the solid lubricant 3b is performed, thereby reducing power consumption. In addition, in the present illustrative embodiment, the first and second electrode members 42a and 42b are formed of a relatively inexpensive material such as sheet metal. Thus, the rotation detector 42 is provided at reduced cost.

As described previously, the lubricant gauge 40 is disposed near both ends of the solid lubricant 3b in the longitudinal direction thereof. Therefore, even when the solid lubricant 3b is consumed at different rates at both ends thereof in the longitudinal direction, upon reaching the near-end stage at one end of the solid lubricant 3b, the rotary member 41 included in the lubricant gauge 40 provided near that end is rotated so that the second electrode member 42b contacts the first electrode member 42a to establish electrical continuity therebetween. Thus, the near-end stage of the solid lubricant 3b at either end thereof is accurately detected, thereby preventing damage to the surface of the photoconductor 1 due to the exhaustion of the solid lubricant 3b.

Similar to the first illustrative embodiment, the lubricant gauge 40 is disposed outside the casing 3e according to the second illustrative embodiment. Thus, adherence of scattered powdered lubricant to the first and second electrode members 42a and 42b is prevented.

Although being contactable against the lubricant holder 3d in the above-described example, alternatively, the contact part 41d of the rotary member 41 may be contactable against the solid lubricant 3b. However, because the solid lubricant 3b is fragile, it may crack when contacted by the contact part 41d of the rotary member 41. For this reason, it is preferable that the contact part 41d of the rotary member 41 be contactable against the lubricant holder 3d.

In the lubricant gauge 40 according to the second illustrative embodiment, the rotary member 41 extends in the longitudinal direction of the solid lubricant 3b and has the contact part 41d contactable against the lubricant holder 3d at one end and the detection part 41c at the other end. The rotation of the rotary member 41 is detected by the rotation detector 42 when the detection part 41c of the rotary member 41 presses the second electrode member 42b against the first electrode member 42a, thereby detecting the near-end stage of the solid lubricant 3b. Such a configuration allows a contact portion, in which the first and second electrode members 42a and 42b contact each other, to be positioned away from the opening 31e as illustrated in FIGS. 12A and 12B. As a result, adherence of the powdered lubricant scraped off from the solid lubricant 3b by the application roller 3a to the first and second electrode members 42a and 42b is prevented. Thus, an irregular electrical continuity between the first and second electrode members 42a and 42b caused by adherence of the powdered lubricant to the first and second electrode members 42a and 42b is prevented, thereby accurately detecting the near-end stage of the solid lubricant 3b.

In the second illustrative embodiment, the rotary member 41 extends in the longitudinal direction of the solid lubricant 3b. Therefore, compared to a case in which the rotary member 41 extends in a lateral direction of the solid lubricant 3b, the detection part 41c of the rotary member 41 is positioned farther away from the opening 31e without at the same time increasing the size of the lubricant gauge 40.

In addition, the partition wall 43b included in the cover member 43 divides the internal space encompassed by the cover member 43 into the first part, within which the opening 31e is provided, and the second part, within which the first and second electrode members 42a and 42b are disposed. As a result, adherence of lubricant scattered through the opening 31e to the first and second electrode members 42a and 42b is further prevented. It is to be noted that the partition wall 43b may be provided to either the cover member 43 or the casing 3e. Further alternatively, the cover member 43 and the casing 3e, each having a partition wall, may be combined together so that the internal space encompassed by the cover member 43 is divided into the first part, within which the opening 31e is provided, and the second part, within which the first and second electrode members 42a and 42b are disposed.

The opening 31e and the first and second electrode members 42a and 42b are covered with the cover member 43. Accordingly, the powdered lubricant is prevented from scattering outside the lubricant applicator 3 via the opening 31e, thereby preventing the interior of the image forming apparatus 10 from getting contaminated. In addition, adherence of the scattered toner to the first and second electrode members 42a and 42b is prevented, thereby preventing irregular electrical continuity between the first and second electrode members 42a and 42b.

In the second illustrative embodiment, the rotary member 41 is rotated by gravity. As a result, a biasing member such as a spring that biases the contact part 41d of the rotary member 41 to rotate the rotary member 41 clockwise in FIGS. 13B and 14B even after the contact part 41d is separated from the lateral face of the lubricant holder 3d is not needed. Thus, the number of components is reduced, thereby reducing production cost.

In the present illustrative embodiment, the cover member 43 holds the first and second electrode members 42a and 42b and the rotary member 41. Because the first and second electrode members 42a and 42b and the rotary member 41 are supported by the same member, that is, the cover member 43, accumulation of tolerances is minimized. Accordingly, the first and second electrode members 42a and 42b and the rotary member 41 are accurately positioned relative to one another. As a result, the second electrode member 42b reliably contacts the first electrode member 42a when the solid lubricant 3b reaches the near-end stage, thereby accurately detecting the near-end stage of the solid lubricant 3b.

Because the second electrode member 42b is bent to contact the first electrode member 42a according to the second illustrative embodiment, it may be deformed over time. In addition, contamination and corrosion caused by contact of the first and second electrode members 42a and 42b each other may cause erroneous detection of the near-end stage of the solid lubricant 3b. Therefore, at the end of its product life, the lubricant gauge 40 needs to be replaced with a new lubricant gauge 40. As described previously, the cover member 43 holds the first and second electrode members 42a and 42b and the rotary member 41. Thus, the lubricant gauge 40 is easily detachable from the lubricant applicator 3 by simply removing the cover member 43 from the casing 3e, thereby facilitating replacement of the lubricant gauge 40.

It is to be noted that, in the present illustrative embodiment, the lubricant gauge 40 detects a state in which the solid lubricant 3b still has a slight amount remaining to be supplied to the surface of the photoconductor 1 for predetermined number of sequences of image formation. If the lubricant gauge 40 detects the last stage of use of the solid lubricant 3b immediately before exhaustion of the solid lubricant 3b, image formation is prohibited until the solid lubricant 3b is replaced with a new solid lubricant 3b in order to prevent irregular image formation caused by exhaustion of the solid lubricant 3b, thereby causing downtime.

By contrast, in the present illustrative embodiment, the near-end stage of the solid lubricant 3b is detected as described above. Accordingly, the lubricant is still supplied to the surface of the photoconductor 1 for the predetermined number of sequences of image formation even after the detection of the near-end stage, thereby securely protecting the surface of the photoconductor 1. As a result, image formation is performed without downtime even after the detection until the replacement of the solid lubricant 3b. However, if image formation is performed at the predetermined number of sequences before the replacement of the solid lubricant 3b, the solid lubricant 3b is used up, causing the problems caused by the exhaustion of the solid lubricant 3b. To prevent these problems, when the near-end stage of the solid lubricant 3b is detected, the cumulative distance traveled by the application roller 3a, the number of sequences of image formation performed, or the like is monitored. Then, when the cumulative distance traveled by the application roller 3a, the number of sequences of image formation performed, or the like reaches a predetermined threshold, it is determined that the solid lubricant 3b reaches the last stage of use, so that image formation is prohibited.

The amount of lubricant supplied to the photoconductor 1 is not constant but varies depending on an area ratio of an image formed on the surface of the photoconductor 1. Specifically, upon the primary transfer of the toner image onto the intermediate transfer belt 56 from the surface of the photoconductor 1, onto which the lubricant is supplied by the lubricant applicator 3, such lubricant may be also transferred onto the intermediate transfer belt 56, together with the toner image, from the surface of the photoconductor 1. Thus, compared to the surface of the photoconductor 1 onto which a toner image with a lower area ratio is formed, the surface of the photoconductor 1 onto which a toner image with a higher area ratio is formed has a smaller amount of lubricant thereon after the primary transfer of the toner image from the surface of the photoconductor 1 onto the intermediate transfer belt 56. As a result, a larger amount of lubricant is supplied to the surface of the photoconductor 1, onto which the toner image with a higher area ratio is formed. For these reasons, consumption of the solid lubricant 3b differs between a case in which the image with a lower area ratio such as a letter is often formed and a case in which the image with a higher area ratio such as a photograph is often formed. Therefore, unlike the present illustrative embodiment, if the near-end stage of the solid lubricant 3b is determined only by an operating time such as a cumulative distance traveled by the application roller 3a, accurate detection of the near-end stage of the solid lubricant 3b under all usage conditions is not possible. For example, in a case in which the near-end stage of the solid lubricant 3b is determined by a cumulative distance traveled by the application roller 3a for a usage condition in which the solid lubricant 3b is heavily consumed, replacement of the solid lubricant 3b, which is not used up yet under a usage condition in which the solid lubricant 3b is less consumed, may be prompted. Conversely, in a case in which the near-end stage of the solid lubricant 3b is determined by a cumulative distance traveled by the application roller 3a for the usage condition in which the solid lubricant 3b is less consumed, the solid lubricant 3*b* may be used up before the detection of the near-end stage under the usage condition in which the solid lubricant 3*b* is heavily consumed.

By contrast, in the present illustrative embodiment, the near-end stage of the solid lubricant 3*b* is detected by the lubricant gauges 40 based on the height of the solid lubricant 3*b*. As a result, the near-end stage of the solid lubricant 3*b* is more accurately detected, regardless of the usage conditions, compared to the configuration in which the cumulative distance traveled by the application roller 3*a* is used for determining the near-end stage of the solid lubricant 3*b*.

In the present illustrative embodiment, the restriction member 43*d* is provided to restrict the rotation of the rotary member 41. Unlike the present illustrative embodiment, in a case in which the restriction member 43*d* is not provided, the rotary member 41 may be rotated so that the contact part 41*d* of the rotary member 41 may be in a lower position upon replacement of the lubricant gauge 40. Mounting of the lubricant gauge 40 to the lateral face of the casing 3*e* with the contact part 41*d* of the rotary member 41 in the lower position prevents accurate detection of the near-end stage of the solid lubricant 3*b*. Therefore, upon mounting of the lubricant gauge 40 to the lateral face of the casing 3*e*, the user needs to confirm that the contact part 41*d* of the rotary member 41 is in an upper position and thus contacts the lubricant holder 3*d*, thereby complicating the replacement of the lubricant gauge 40. Further, during the replacement, too much pressing of the second electrode member 42*b* against the first electrode member 42*a* by the detection part 41*c* of the rotary member 41 may cause plastic deformation of the first and second electrode members 42*a* and 42*b*. Plastic deformation of the first electrode member 42*a* prevents the second electrode member 42*b* pressed by the detection part 41*c* of the rotary member 41*c* from contacting the first electrode member 42*a* even upon reaching the near-end stage, causing erroneous detection of the near-end stage of the solid lubricant 3*b*. In addition, plastic deformation of the second electrode member 42*b* may cause the second electrode member 42*b* to contact the first electrode member 42*a* even when the detection part 41*c* of the rotary member 41 does not press the second electrode member 42*b* against the first electrode member 42*b*, causing erroneous detection of the near-end stage of the solid lubricant 3*b*.

In the second illustrative embodiment, the restriction member 43*d* is provided. Therefore, upon replacement of the lubricant gauge 40, the detection part 41*c* of the rotary member 41 abuts the restriction member 43*d* so that clockwise rotation of the rotary member 41 in FIGS. 13 and 14 is restricted by the restriction member 43*d*. Accordingly, upon replacement of the lubricant gauge 40, the contact part 41*d* of the rotary member 41 is securely lifted to the upper position. As a result, the contact part 41*d* of the rotary member 41 reliably contacts the lubricant holder 3*d* upon mounting of the lubricant gauge 40 to the lateral face of the casing 3*e*, thereby facilitating replacement of the lubricant gauge 40. In addition, restriction of the rotation of the rotary member 41 by the restriction member 43*d* prevents the second electrode member 42*b* from being pressed against the first electrode member 42*a* too much, thereby preventing plastic deformation of the first and second electrode members 42*a* and 42*b*.

In some cases, the rotary member 41 may not sufficiently extend in the longitudinal direction of the solid lubricant 3*b*, and therefore, there may be no space to provided the partition wall 43*b*. Consequently, powdered lubricant scattered through the opening 31*e* of the casing 3*e* may adhere to the first and second electrode members 42*a* and 42*b*. In particular, in a usage condition in which an image with a lower area ratio is often formed, powdered lubricant, which is not supplied to the surface of the photoconductor 1 from the application roller 3*a*, accumulates within the casing 3*e*. As a result, a part of the lubricant accumulating within the casing 3*e* scatters outside the casing 3*e* through the opening 31*e* and may adhere to the first and second electrode members 42*a* and 42*b*. An increase in the amount of lubricant adhering to the first or second electrode member 42*a* or 42*b* causes irregular electrical continuity between the first and second electrode members 42*a* and 42*b*, thereby preventing accurate detection of the near-end stage of the solid lubricant 3*b*. Consequently, the solid lubricant 3*b* may be used up without the near-end stage being detected, and thus the surface of the photoconductor 1 may not be protected with the lubricant.

To prevent the above-described problems, the near-end stage of the solid lubricant 3*b* may be detected based on both the cumulative distance traveled by the application roller 3*a* and establishment of the electrical continuity between the first and second electrode members 42*a* and 42*b* in a manner similar to the first illustrative embodiment as illustrated in FIG. 8 previously.

The lubricant gauge 40 also detects whether the solid lubricant 3*b* is properly set in the lubricant holder 3*d*. Specifically, the contact part 41*d* of the rotary member 41 does not contact the lubricant holder 3*d* in a state in which the solid lubricant 3*b* is not set in the lubricant holder 3*d* yet or is not properly set in the lubricant holder 3*d*. In other words, also in the above-described state, the detection part 41*c* of the rotary member 41 presses against the second electrode member 42*b* so that the second electrode member 42*b* contacts the first electrode member 42*a*. Therefore, in the state in which the solid lubricant 3*b* is not set in the lubricant holder 3*d* yet or is not properly set in the lubricant holder 3*d*, establishment of the electrical continuity between the first and second electrode members 42*a* and 42*b* is detected by the resistance detector 42*c*. Upon replacement of the process cartridge 11 or the lubricant applicator 3, establishment of the electrical continuity between the first and second electrode members 42*a* and 42*b* is detected by the resistance detector 42*c*, so that whether the solid lubricant 3*b* is properly set in the lubricant holder 3*d* is detected.

Figure 15:
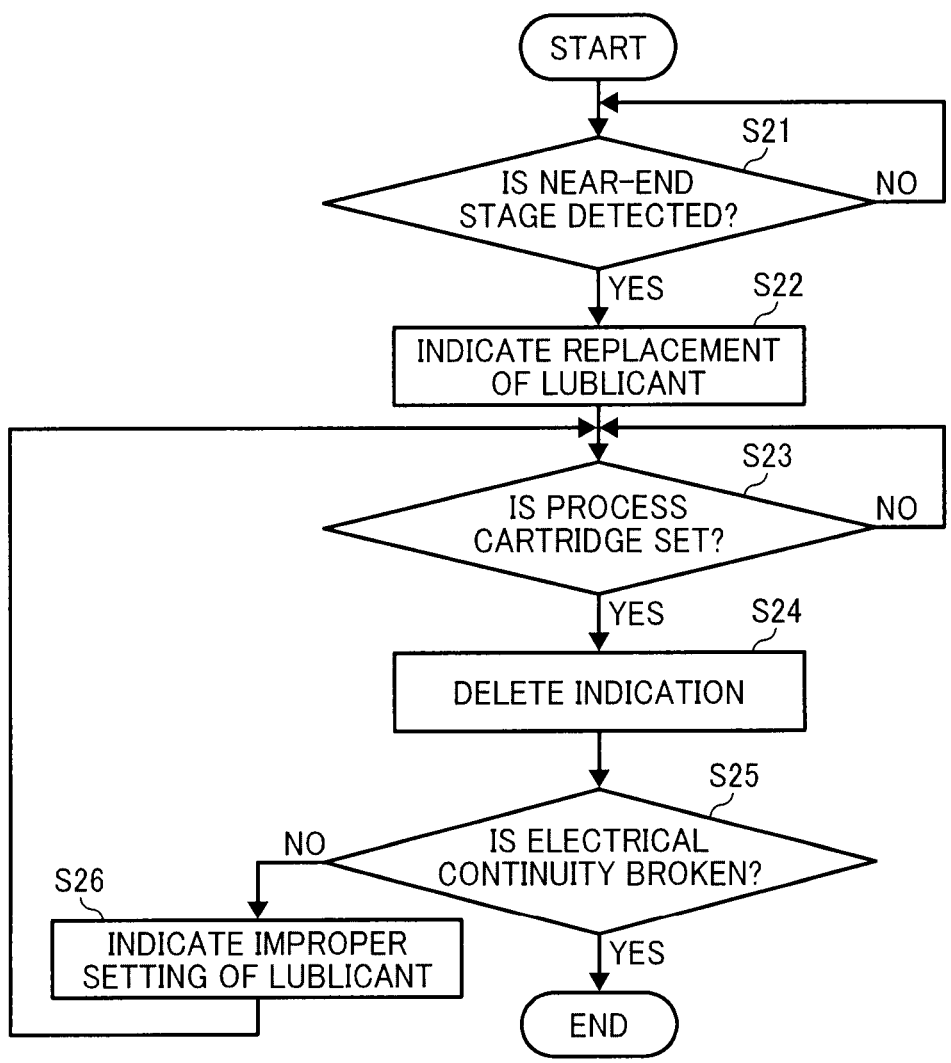
FIG. 15 is a flowchart illustrating steps in a process of detecting setting of the solid lubricant.

FIG. 15 is a flowchart illustrating steps in a process of detecting setting of the solid lubricant 3*b*.

At step S21, whether or not the solid lubricant 3*b* reaches the near-end stage is detected. When the second electrode member 42*b* contacts the first electrode member 42*a* so that establishment of the electrical continuity between the first and second electrode members 42*a* and 42*b* is detected by the resistance detector 42*c* (YES at S21), the process proceeds to step S22 so that the control unit 100 displays a message on a display unit, not shown, to prompt the user to replace the solid lubricant 3*b* with a new solid lubricant 3*b*. At step S23, the control unit 100 determines whether or not the process cartridge 11 is installed in the image forming apparatus 10. For example, installation of the process cartridge 11 may be detected by detecting whether a cover, which is opened upon replacement of the process cartridge 11, is opened or closed. Alternatively, a detector that detects presence or absence of the process cartridge 11 may be provided. When the process cartridge 11 is installed in the image forming apparatus 10 (YES at S23), the process proceeds to step S24 so that the control unit 100 deletes the message prompting the user to replace the solid lubricant 3*b*. Thereafter, at step S25 the resistance detector 42*c* determines whether the electrical continuity is broken between the first and second electrode members 42a and 42b. When the resistance detector 42c detects that the electrical continuity between the first and second electrode members 42a and 42b is broken (YES at S25), the control unit 100 determines that the new solid lubricant 3b is properly set in the lubricant holder 3d to complete the process. By contrast, when the resistance detector 42c detects that the electrical continuity is established between the first and second electrode members 42a and 42b (NO at S25), the process proceeds to step S26 so that the control unit 100 displays on the display unit a message indicating improper setting or absent of the solid lubricant 3b in the lubricant holder 3d. Thereafter, the process returns to S23 to determine whether or not the process cartridge 11 is installed in the image forming apparatus 10. Thus, improper replacement of the solid lubricant 3b is prevented.

A description is now given of an example of a configuration of the lubricant gauge 40 according to a first variation of the second illustrative embodiment.

Figure 16A:
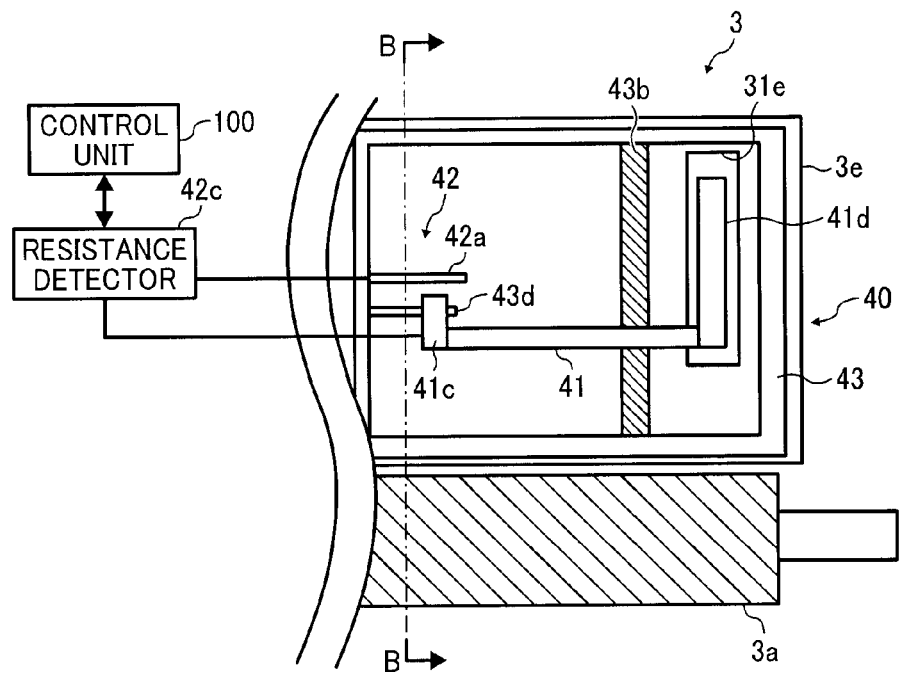
FIG. 16A is a schematic view illustrating an example of a configuration of a lubricant gauge in the early stage of use of the solid lubricant according to a first variation of the second illustrative embodiment.
Figure 16B:
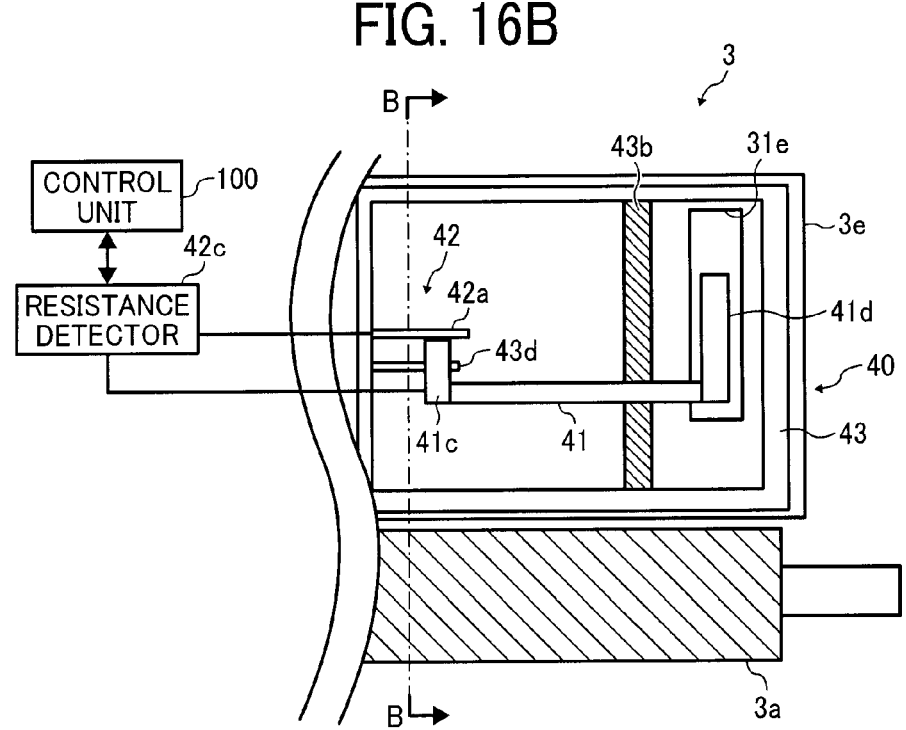
FIG. 16B is a schematic view of the lubricant gauge illustrated in FIG. 16A in the near-end stage of the solid lubricant.
Figure 17A:
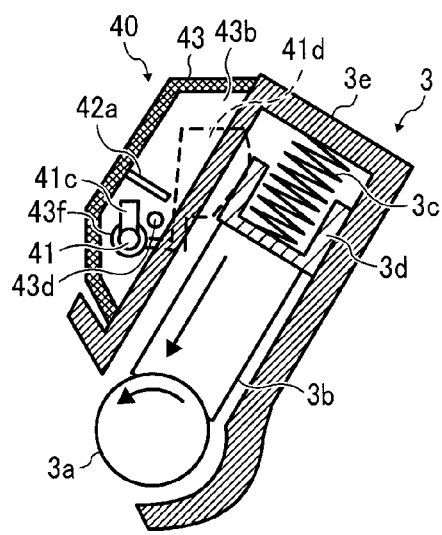
FIG. 17A is a vertical cross-sectional view along line B-B in FIG. 16A.
Figure 17B:
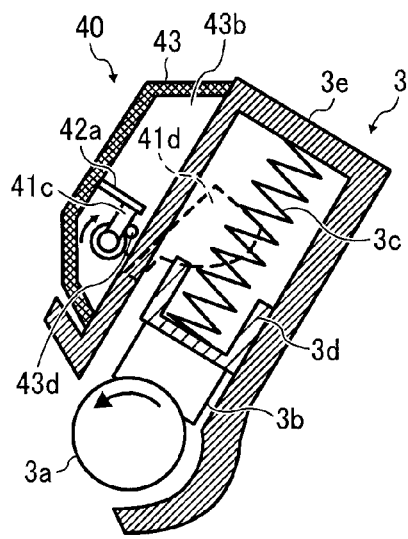
FIG. 17B is a vertical cross-sectional view along line B-B in FIG. 16B.

FIG. 16A is a schematic view illustrating an example of a configuration of the lubricant gauge 40 in the early stage of use of the solid lubricant 3b according to the first variation of the second illustrative embodiment. FIG. 16B is a schematic view of the lubricant gauge 40 illustrated in FIG. 16A in the near-end stage of the solid lubricant 3b. FIG. 17A is a vertical cross-sectional view along line B-B in FIG. 16A. FIG. 17B is a vertical cross-sectional view along line B-B in FIG. 16B.

In the lubricant gauge 40 according to the first variation of the second illustrative embodiment, the rotary member 41 is constructed of a conductive member and replaces the second electrode member 42b. Accordingly, the resistance detector 42c is connected to the first electrode member 42a and the rotary member 41.

As illustrated in FIG. 17A, in the early stage of use of the solid lubricant 3b, the contact part 41d of the rotary member 41 abuts the lubricant holder 3d so that the rotation of the rotary member 41 by gravity is restricted by the lubricant holder 3d. At this time, the detection part 41c of the rotary member 41 is positioned away from the first electrode member 42a as illustrated in FIGS. 16A and 17A. Accordingly, no electric current flows between the first electrode member 42a and the rotary member 41 even when the resistance detector 42c applies a voltage between the first electrode member 42a and the rotary member 41, and thus the resistance detector 42c does not measure an electrical resistance.

When the solid lubricant 3b reaches the near-end stage, the contact part 41d is separated from the lateral face of the lubricant holder 3d, so that the rotary member 41 is rotated by gravity and the detection part 41c of the rotary member 41 contacts the first electrode member 42a as illustrated in FIGS. 16B and 17B. Accordingly, electrical continuity is established between the first electrode member 42a and the rotary member 41. Thus, application of a voltage between the first electrode member 42a and the rotary member 41 by the resistance detector 42c generates an electric current between the first electrode member 42a and the rotary member 41. As a result, the resistance detector 42c measures an electrical resistance so that the near-end stage of the solid lubricant 3b is detected.

In the first variation of the second illustrative embodiment, the second electrode member 42b is eliminated, thereby reducing the number of components and the production cost. Although the rotary member 41 is constructed of a conductive member in the above-described example, alternatively, only the detection part 41c may be constructed of a conductive member, or only a contact portion of the detection part 41c that contacts the first electrode member 42a may be constructed of a conductive member. Further alternatively, the restriction member 43d constructed of a conductive member may be used as the first electrode member 42a.

Figure 18:
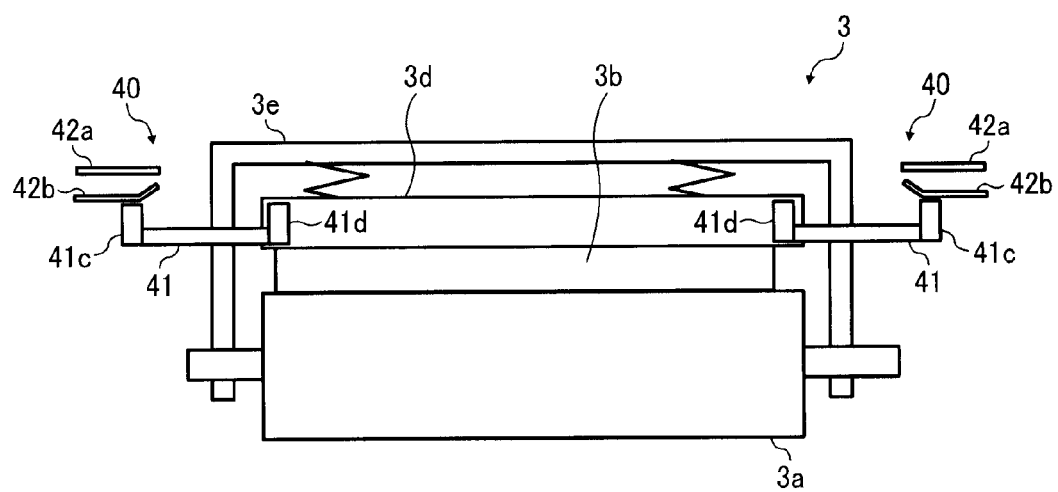
FIG. 18 is a schematic view illustrating an example of a configuration of a lubricant gauge according to a second variation of the second illustrative embodiment.

A description is now given of an example of a configuration of the lubricant gauge 40 according to a second variation of the second illustrative embodiment with reference to FIG. 18.

In the second variation, the rotary member 41 penetrates a lateral face of the casing 3e that faces the end of the solid lubricant 3b in the longitudinal direction. Such a configuration allows the casing 3e to only have a hole through which the rotary member 41 penetrates, thereby preventing scattering of powdered lubricant outside the casing 3e. As a result, adherence of lubricant scattered outside the casing 3e to the first and second electrode members 42a and 42b is further prevented. Alternatively, the lubricant gauge 40 may be mounted to a lateral face of the casing 3e positioned below the lubricant holder 3d. In such a case, a biasing member such as a spring is further provided to bias the contact part 41d of the rotary member 41 toward the lubricant holder 3d. Accordingly, when the contact part 41d of the rotary member 41 is separated from the lubricant holder 3d, the rotary member 41 is rotated by the biasing force of the spring, so that the detection part 41c of the rotary member 41 presses the second electrode member 42b against the first electrode member 42a.

Figure 19:
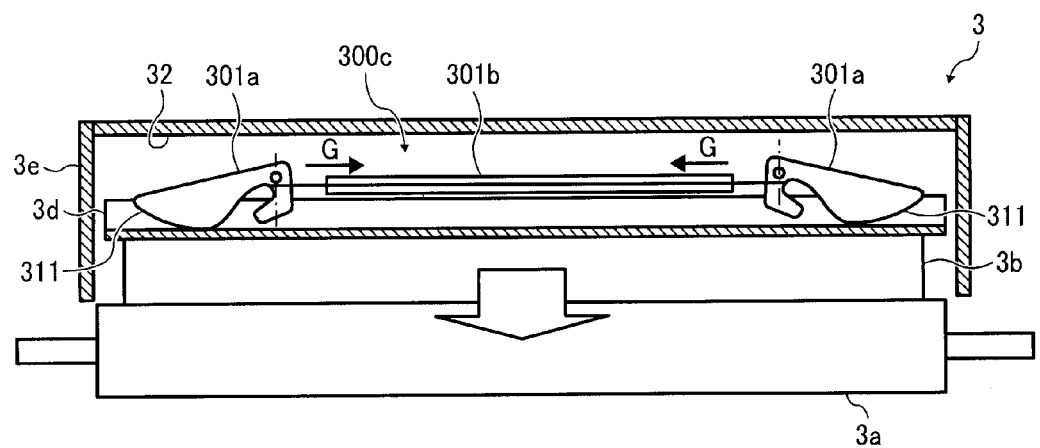
FIG. 19 is a schematic view illustrating an example of a configuration of a pressing mechanism included in the lubricant applicator according to a first variation of illustrative embodiments.

A description is now given of an example of a configuration of a pressing mechanism 300c, which is a variation of the pressing mechanism 3c included in the lubricant applicator 3 according to the foregoing illustrative embodiments. FIG. 19 is a schematic view illustrating an example of a configuration of the pressing mechanism 300c.

The pressing mechanism 300c is constructed of swinging members 301a swingably provided to the casing 3e near both ends of the lubricant holder 3d in the longitudinal direction, respectively, and a biasing member, that is, a spring 301b. Specifically, both ends of the spring 301b are mounted to the respective swinging members 301a. The swinging members 301a are biased inward to the center of the lubricant holder 3d in the longitudinal direction as indicated by arrows G in FIG. 19 by the spring 301b. Accordingly, the swinging member 301a positioned on the right in FIG. 19 swings in a counterclockwise direction, and the swinging member 301a positioned on the left in FIG. 19 swings in a clockwise direction. As a result, an arc-shaped edge portion 311 of each swinging member 301a that contacts the lubricant holder 3d is biased toward the lubricant holder 3d as illustrated in FIG. 19.

In the early stage of use of the solid lubricant 3b, the swinging members 301a swing toward an inner surface 32 of an upper portion of the casing 3e against the biasing force of the spring 301b. Such a configuration enables the swinging members 301a biased by the spring 301b to press against the lubricant holder 3d with an equal force, so that the solid lubricant 3b held by the lubricant holder 3d is evenly pressed against the application roller 3a across the longitudinal direction. As a result, an amount of lubricant scraped off by rotation of the application roller 3a is equal across the longitudinal direction, and therefore, the lubricant is evenly supplied to the surface of the photoconductor 1.

Thus, the pressing mechanism 300c presses the solid lubricant 3b against the application roller 3a with substantially the same force over time even as the solid lubricant 3b is reduced. As a result, unevenness in the amount of powdered lubricant scraped off by the application roller 3a and supplied to the surface of the photoconductor 1 is minimized from the early stage to the last stage of use of the solid lubricant 3b.

The following are reasons for obtaining the above-described effects.

In general, the longer the length of a spring, the smaller the variation in a biasing force of the spring relative to a change in an amount of extension of the spring from the early stage to the last stage of use of the solid lubricant 3b. In a related-art pressing mechanism, the spring in a compressed state is disposed within the casing 3e, and a direction of a biasing force of the spring is identical to a direction in which the solid lubricant 3b is pressed against the application roller 3a. In such a configuration, the longer the length of the spring, the more difficult it is to set the direction of the biasing force of the spring to be identical to the direction in which the solid lubricant 3b is pressed against the application roller 3a. Thus, the length of the spring is limited. Further, in the related-art configuration, a space for the length of the spring is needed in a direction of the diameter of the application roller 3a, resulting in an increase in the overall size of the lubricant applicator 3. For these reasons, in the related-art pressing mechanism, a relatively short spring is used, making the pressing mechanism vulnerable to variation in the biasing force of the spring over time.

By contrast, in the pressing mechanism 300c illustrated in FIG. 19, the spring 301b in the extended state is disposed within the casing 3e, and a tractive force of the spring 301b is used for pressing the solid lubricant 3b against the application roller 3a. Thus, even the longer spring 301b does not cause the problems described above. In addition, in the pressing mechanism 300c, the spring 301b is disposed such that the longitudinal direction of the spring 301b is identical to the longitudinal direction of the solid lubricant 3b, that is, an axial direction of the application roller 3a. Therefore, use of the longer spring 301b does not increase a space for the spring 301b in the direction of diameter of the application roller 3a, thereby allowing the lubricant applicator 3 to be made more compact. Thus, the pressing mechanism 300c illustrated in FIG. 19 employs the relatively longer spring 301b. As a result, variation in the biasing force of the spring 301b over time is minimized.

Figure 20:
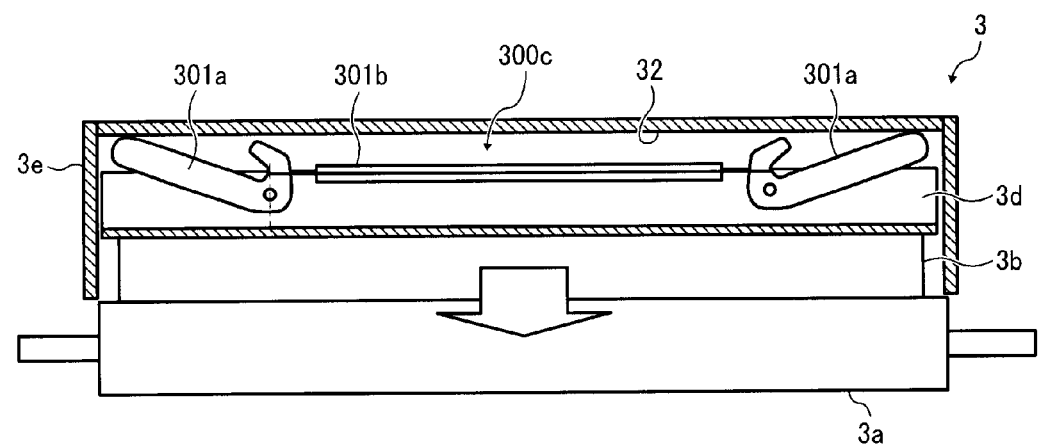
FIG. 20 is a schematic view illustrating an example of a configuration of a pressing mechanism included in the lubricant applicator according to a second variation of illustrative embodiments.

Alternatively, the swinging members 301a may be swingably mounted to the lubricant holder 3d as illustrated in FIG. 20. In the configuration illustrated in FIG. 20, the spring 301b biases the swinging members 301a toward the center of the lubricant holder 3d in the longitudinal direction so that a free end of each swinging member 301a is biased away from the lubricant holder 3d to contact the inner surface 32 of the upper portion of the casing 3e.

In the foregoing illustrative embodiments, the first and second electrode members 42a and 42b are vertically aligned to face each other, and consequently, scattered lubricant or the like may accumulate on the upper surfaces of the first and second electrode members 42a and 42b. To solve this problem, the first and second electrode members 42a and 42b may be horizontally aligned to face each other. Accordingly, the first and second electrode members 42a and 42b face vertically in a direction perpendicular to the horizontal direction. Such a configuration prevents accumulation of the powdered lubricant on the first and second electrode members 42a and 42b and thus prevents irregular electrical continuity between the first and second electrode members 42a and 42b, thereby accurately detecting the near-end stage of the solid lubricant 3b.

It is to be noted that, in place of the first and second electrode members 42a and 42b, a push switch may be used for detecting the rotation of the rotary member 41. In such a configuration, when the rotary member 41 is moved to the position that indicates the near-end stage of the solid lubricant 3b, the detection part 41a of the rotary member 41 presses the push switch to detect the near-end stage of the solid lubricant 3b.

Alternatively, the rotation of the rotary member 41 may be detected by a photointerrupter. In such a configuration, when the rotary member 41 is moved to the position that indicates the near-end stage of the solid lubricant 3b, the detection part 41a or 41c of the rotary member 41 cuts off light to detect the near-end stage of the solid lubricant 3b. Alternatively, the detection part 41a or 41c of the rotary member 41 may cut off light emitted from the photointerrupter in the early stage of use of the solid lubricant 3b, and when the solid lubricant 3b reaches the near-end stage and the rotary member 41 is rotated, the detection part 41a or 41c of the rotary member 41 may be retracted from that position so that the light is detected by the photointerrupter to detect the near-end stage of the solid lubricant 3b. The near-end stage of the solid lubricant 3b may be detected also by a photoreflector. In such a case, a reflector is provided to the detection part 41a or 41c of the rotary member 41 at a position opposite the photoreflector. When the rotary member 41 is moved to the position that indicates the near-end stage of the solid lubricant 3b, the detection part 41a or 41c of the rotary member 41 reflects light emitted from the photoreflector. The light thus reflected is received by the photoreflector so that the near-end stage of the solid lubricant 3b is detected. Alternatively, the detection part 41a or 41c of the rotary member 41 may be positioned opposite the photoreflector to reflect the light in the early stage of use of the solid lubricant 3b, and when the solid lubricant 3b reaches the near-end stage and the rotary member 41 is rotated, the detection part 41a or 41c of the rotary member 41 may be retracted from that position so that the light is not detected by the photointerrupter to detect the near-end stage of the solid lubricant 3b.

The foregoing illustrative embodiments are applicable to a lubricant applicator that supplies lubricant to the intermediate transfer belt 56.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the scope of the present invention, and all such modifications as would be obvious to one skilled in the art are intended to be included within the scope of the following claims.

The number of constituent elements and their locations, shapes, and so forth are not limited to any of the structure for performing the methodology illustrated in the drawings.

What is claimed is:
1. A lubricant supplying device, comprising:
a lubricant;
a lubricant supplier to supply the lubricant to a lubricant supply target;
a first electrode and a second electrode; and
a detector to detect an electric resistance between the first electrode and the second electrode, wherein the second electrode includes a fixed portion and a movable portion, and the movable portion of the second electrode moves towards the first electrode as the lubricant is consumed, wherein the first electrode and the second electrode are in contact with each other when the amount of lubricant is less than a predetermined amount, and wherein the second electrode is free of direct contact with the lubricant when the amount of lubricant is greater than the predetermined amount.

2. The lubricant supplying device according to claim 1, wherein the second electrode is rotatable, and the fixed portion is a shaft around which the movable portion rotates.

3. The lubricant supplying device according to claim 1, wherein the second electrode is planar.

4. The lubricant supplying device according to claim 3, wherein the fixed portion is on a first end of the second electrode, and the movable portion is on a second end of the second electrode.

5. The lubricant supplying device according to claim 4, further comprising a rotator which rotates to the second electrode as the lubricant is consumed and moves the second electrode to the first electrode by rotation.

6. An image forming apparatus comprising:
the lubricant supplying device according to claim 1; and
a controller to determine an amount of the lubricant based on the electric resistance detected by the detector.

7. A lubricant supplying device, comprising:
a lubricant;
a lubricant supplier to supply the lubricant to a lubricant supply target;
a first electrode and a second electrode; and
a detector to detect an electric resistance between the first electrode and the second electrode,
wherein the second electrode is bendable, and the second electrode bends toward the first electrode, as the lubricant is consumed,
wherein the first electrode and the second electrode are in contact with each other when the amount of lubricant is less than a predetermined amount, and
wherein the second electrode is free of direct contact with the lubricant when the amount of lubricant is greater than the predetermined amount.

8. The lubricant supplying device according to claim 7, wherein an end of the second electrode bends toward the first electrode, as the lubricant is consumed.

9. The lubricant supplying device according to claim 7, wherein the second electrode is planar.

10. The lubricant supplying device according to claim claim 7, wherein the second electrode bends from a position parallel to the first electrode.

11. The lubricant supplying device according to claim 7, further comprising a rotator which bends, by rotation, the second electrode toward the first electrode.

12. An image forming apparatus comprising the lubricant supplying device according to claim 7.

13. The image forming apparatus according to claim 12, further comprising a controller to determine an amount of the lubricant based on the electric resistance detected by the detector.

14. The lubricant supplying device according to claim 7, wherein the first electrode and the second electrode extend in a longitudinal direction of the lubricant.

15. The lubricant supplying device according to claim 14, wherein a base point of bending of the second electrode is positioned outside a center in a longitudinal direction of the second electrode.

16. The lubricant supplying device according to claim 7, wherein an inner end of the first electrode extends farther towards a center of the lubricant than an inner end of the second electrode in a longitudinal direction of the lubricant.

17. A lubricant supplying device, comprising:
a lubricant;
a lubricant supplier to supply the lubricant to a lubricant supply target;
a first electrode and a second electrode; and
a detector to detect an electric resistance between the first electrode and the second electrode,
wherein the second electrode is rotatably mounted, and the second electrode rotates toward the first electrode, as the lubricant is consumed,
wherein the first electrode and the second electrode are in contact with each other when the amount of lubricant is less than a predetermined amount, and
wherein the second electrode is free of direct contact with the lubricant when the amount of lubricant is greater than the predetermined amount.

18. The lubricant supplying device according to claim 17, wherein an end of the second electrode bends toward the first electrode, as the lubricant is consumed.

19. The lubricant supplying device according to claim 17, further comprising a movable member to move as the lubricant is consumed,
wherein the movable member causes the second electrode to rotate.

20. An image forming apparatus comprising:
the lubricant supplying device according to claim 17; and
a controller to determine an amount of the lubricant based on the electric resistance detected by the detector.

* * * * *